United States Patent
Gatlin et al.

(10) Patent No.: US 7,971,659 B2
(45) Date of Patent: Jul. 5, 2011

(54) FOAMER/SULFUR SCAVENGER COMPOSITION AND METHODS FOR MAKING AND USING SAME

(75) Inventors: Larry W. Gatlin, San Antonio, TX (US); Jack Curr, The Woodlands, TX (US); Kevin Smith, Houston, TX (US); Steve Turk, Conroe, TX (US)

(73) Assignee: Clearwater International, LLC DE (US)

(*) Notice: Subject to any disclaimer, the term of this patent is extended or adjusted under 35 U.S.C. 154(b) by 906 days.

(21) Appl. No.: 10/839,734

(22) Filed: May 5, 2004

(65) Prior Publication Data

US 2005/0250666 A1 Nov. 10, 2005

(51) Int. Cl.
C09K 8/38 (2006.01)
(52) U.S. Cl. .......................................................... 175/69
(58) Field of Classification Search .................. 175/69
See application file for complete search history.

(56) References Cited

U.S. PATENT DOCUMENTS

| | | | |
|---|---|---|---|
| 2,196,042 A | 4/1940 | Morris | 23/11 |
| 4,461,716 A | 7/1984 | Barbarin et al. | 252/307 |
| 2005/0130847 A1 | 6/2005 | Gatlin et al. | |
| 2005/0137114 A1 | 6/2005 | Gatlin et al. | |
| 2005/0153846 A1 | 7/2005 | Gatlin | |
| 2006/0116296 A1 | 6/2006 | Kippie et al. | |
| 2006/0194700 A1 | 8/2006 | Gatlin et al. | |

OTHER PUBLICATIONS

U.S. Appl. No. 11/328,432, filed Jan. 9, 2006, Wilson.
U.S. Appl. No. 11/293,859, filed Dec. 2, 2005, Kippie et al.
U.S. Appl. No. 11/298,547, filed Dec. 9, 2005, Gatlin et al.
U.S. Appl. No. 11/298,556, filed Dec. 9, 2005, Gatlin et al.
U.S. Appl. No. 11/339,303, filed Jan. 25, 2006, Lukos et al.
U.S. Appl. No. 11/545,387, filed Oct. 10, 2006, Gatlin et al.
U.S. Appl. No. 11/554,834, filed Oct. 31, 2006, Venditto et al.

*Primary Examiner* — Necholus Ogden, Jr.
(74) *Attorney, Agent, or Firm* — Robert W Strozier

(57) ABSTRACT

A new multi-purpose foaming composition having applications in oil field application, industrial applications, waste management applications, or other applications that can be benefited by a foam, is disclosed, where the composition includes a surfactant, a sulfur scavenger and optionally an additive, where the sulfur scavenger and/or additive improve foam characteristics and/or the foam improves an activity of the sulfur scavenger and/or the additives. Method for using and making the foaming compositions are also disclosed, especially, coiled and capillary coiled tubing downhole applications.

19 Claims, 9 Drawing Sheets

Corrosion Rate

Imbalance

Corrosion Rate

Imbalance

FOAMER/SULFUR SCAVENGER COMPOSITION AND METHODS FOR MAKING AND USING SAME

BACKGROUND OF THE INVENTION

1. Field of the Invention

The present invention relates to a novel composition including a foaming agent and an additive, where additive improves foam stability and is designed to reduce, reduce below a desired level, or substantially eliminate a fluid contaminant.

More particularly, the present invention relates a novel composition a novel composition including a foaming agent and an additive, where additive improves foam stability and is designed to reduce, reduce below a desired level, or substantially eliminate a fluid contaminant where the contaminants are noxious sulfur-containing species, carbon dioxide, etc. The present invention is also directed to methods for making and using the compositions of this invention. The compositions are ideally suited for waste management applications and downhole applications such as drilling applications, production applications, intervention applications, coiled tubing applications, capillary coiled tubing applications and/or similar applications.

2. Description of the Related Art

In oil and gas drilling operations, it has been the almost universal practice up until recent years to circulate a liquid, such as water, oil, a water-in-oil emulsion, or an oil-in-water emulsion, usually with mud solids, clay particles, suspended therein, to and from the drilling zone during the drilling operation. One of the functions in circulating these drilling fluids, usually in the form of a drilling mud, is to remove drilled solids from the bit and lift cuttings from the bore. As can be readily understood the drilling liquid must be circulated under high pressure to assure entrainment of cuttings and expulsion of mud from the bore hole.

In recent years, some wells have been successfully drilled at a reduced pressure by a different technique in which a compressed gas, such as air, is pumped into the well at the drilling site. This compressed gas flows rapidly up the well bore annulus around the drill collar carrying with it the drilled solids and thus removing them from the drill hole. While in some instances, the drilling operation is essentially a dry process in many formations, water high in electrolyte concentration, enters the bore hole from adjacent water-containing strata, in Canada, under saturated takes fluid. Such water invasion most often occurs while drilling in or through a water bearing subterranean zone, but may also be encountered in any area in the vicinity of trapped underground water. Of course, when using a foam, a certain amount of water is introduced into the fluid to promote foaming.

Some of the advantages of the gas drilling method over the more conventional mud drilling method include increased penetration rate, longer bit life, accurate location of water-bearing zones and measurement of flow, precise location of oil and gas bearing zones, especially those of low formation pressure, flow and pressure testing of productive zones without resort to drill stem tests, a lessening of possible contamination of prospective or known producing zones, and greater flexibility in physical-chemical alteration of the drilling fluid to meet particular down hole conditions. However, one difficulty in mist or dry gas drilling where water seeps into the bore and accumulates in the drilling zone is that the drilled solids tend to agglomerate as the drill string rotates. These agglomerated masses become too heavy to be lifted out by the gas so that antiballing agents, and foaming agents must be introduced into the bore to prevent this condition.

In recent years, the technology of air and mud drilling has been combined in an attempt to provide drilling foams which have greater lifting strength than air but which do not have the pressure limitations of drilling muds.

The rheological properties of aqueous foams are of great importance for a number of applications in petroleum production. These properties include high flow rates in tubes or pipes and in porous media such as oil-bearing sandstones. Aqueous foam has advantages in oil fields that contain viscous oil in low pressure reservoirs. In these operations, the foam raises to the surface not only sand pulverized by the bit but also pebbles and rocks of considerable size.

The requirements for utilization of an aqueous foam in subterranean formations include high stability with waters containing appreciable quantities of soluble salts, such as sodium chloride, calcium salts and/or magnesium salts, and the capability for handling a variety of foam breaking elements such as crude oil and solids. Further the foam must not degrade under extremes of physical environments.

Although numerous foam compositions have been proposed and used, these foaming compositions are designed to decrease column fluid weight, but these compositions do not change the basic properties of the downhole fluids.

Thus, there is a need in the art for compositions that not only decrease fluid column weight by forming a foam, the compositions include additive that increase foam stability and simultaneously change some of the basic properties of the fluid to which the compositions are being added such as reducing the concentration of noxious sulfur-containing species (e.g., $H_2S$, RSH, etc. $CO_2$, etc.), reducing fluid corrosiveness, reducing fluid water concentration, reducing or controlling scale formation, etc.

SUMMARY OF THE INVENTION

General Compositions

The present invention provides a composition including a foaming agent and an additive, where the composition is adapted to produce a foam, where the additive is selected from the group consisting of noxious species scavengers (sulfur-containing species, $CO_2$, $HCO_3$, carbonates, etc.), corrosion inhibitors, scale inhibitors, oxygen control agents, paraffin dispersing agents (hydrocarbon tend to act as defoamers—reducing their impact helps maintain foam integrity), hydrocarbon accumulation agents and mixtures or combinations thereof, where the additive improves foaming characteristics of the foaming agent and/or where the foam improves the activity of the additive.

The present invention provides a composition including a foaming agent and a noxious species sc avenger, where the composition is adapted to produce a foam, where the scavenger improves foaming characteristics of the foaming agent, the scavenger converts noxious or corrosive species into more benign species and/or the foam improves an activity of the scavenger in converting the noxious or corrosive species into the more benign species.

The present invention provides a composition including a foaming agent and an additive, where the composition is adapted to produce a foam, where the foaming agent comprises a surfactant, where the additive is selected from the group consisting of noxious species scavengers, corrosion inhibitors, scale inhibitors, oxygen control agents, hydrocarbon accumulation agents and mixtures or combinations thereof, where the additive improves foaming characteristics of the foaming agent and/or where the foam improves the activity of the additive.

The present invention provides a composition including a foaming agent and a noxious species scavenger, where the composition is adapted to produce a foam, where the foaming agent comprises a surfactant, where the scavenger improves foaming characteristics of the foaming agent, where the scavenger converts noxious or corrosive species into more benign species and/or the foam improves an activity of the scavenger in converting the noxious or corrosive species into the more benign species.

The present invention provides a composition including a foaming agent and an additive, where the composition is adapted to produce a foam, where the foaming agent is selected from the group consisting of a cationic surfactant, an anionic surfactant, a non-ionic surfactant, and mixtures or combinations thereof, where the additive is selected from the group consisting of noxious species scavengers, corrosion inhibitors, scale inhibitors, oxygen control agents, hydrocarbon accumulation agents and mixtures or combinations thereof, where the additive improves foaming characteristics of the foaming agent and/or where the foam improves the activity of the additive.

The present invention provides a composition including a foaming agent and a noxious species scavenger, where the composition is adapted to produce a foam, where the foaming agent is selected from the group consisting of a cationic surfactant, an anionic surfactant, a non-ionic surfactant, and mixtures or combinations thereof, where the scavenger improves foaming characteristics of the foaming agent, where the scavenger converts noxious or corrosive species into more benign species and/or where the foam improves an activity of the scavenger in converting the noxious or corrosive species into the more benign species.

The present invention provides a composition including a foaming agent and an additive, where the composition is adapted to produce a foam, where the foaming agent comprises at least one surfactant selected from the group consisting of a cationic surfactant, an anionic surfactant, a non-ionic surfactant, and mixtures or combinations thereof and at least one zwitterionic compound, where the additive is selected from the group consisting of noxious species scavengers, corrosion inhibitors, scale inhibitors, oxygen control agents, hydrocarbon accumulation agents and mixtures or combinations thereof, where the additive improves foaming characteristics of the foaming agent and/or where the foam improves the activity of the additive.

The present invention provides a composition including a foaming agent and a noxious species scavenger, where the composition is adapted to produce a foam, where the foaming agent comprises at least one surfactant selected from the group consisting of a cationic surfactant, an anionic surfactant, a non-ionic surfactant, and mixtures or combinations thereof and at least one zwitterionic compound, where the scavenger improves foaming characteristics of the foaming agent, the scavenger converts noxious or corrosive species into more benign species and/or the foam improves an activity of the scavenger in converting the noxious or corrosive species into the more benign species.

Specific Compositions

The present invention provides a composition including a foaming agent and a sulfur scavenging agent, where the composition is adapted to produce a foam, where sulfur scavenging agent improves foam characteristics of the foaming agent such as foam stability, foam height, etc. and/or where the foam improves sulfur scavenging agent activity reducing a concentration of a noxious sulfur-containing species and/or carbon dioxide, reducing the concentration of noxious sulfur-containing species and/or carbon dioxide below a desired concentration or substantially eliminating noxious sulfur-containing species. The foaming agent can be comprise any surfactant, mixture of surfactants, or mixtures of surfactants and foaming enhancing agents such as zwitterionic compounds, winterizing agents, foam boosters, etc.

The present invention provides a composition including, a foaming agent and a sulfur scavenging agent, where the compositions produces a foam having improved stability and simultaneously improves sulfur scavenging agent activity for reducing a concentration of a noxious sulfur-containing species and/or carbon dioxide, reducing the concentration of noxious sulfur-containing species and/or carbon dioxide below a desired concentration or for substantially eliminating noxious sulfur-containing species. The foaming agent can be comprise a mixture of surfactants and at least one zwitterionic compounds where the composition is environmentally friendly, biodegradable, produces no residual, and is resistant to high temperatures.

The present invention provides a foaming composition including a foaming agent comprising at least two anionic surfactants, cationic surfactants or a mixture or combination thereof and optionally, at least one zwitterionic compounds and an additive to change a characteristic of the fluid to which the foaming composition is added, where the resulting foam has improved stability and the additive has improved activity, optionally, the composition is environmentally friendly, biodegradable, produces no residual, and is resistant to high temperatures.

The present invention provides a foaming composition including a foaming agent comprising at least two anionic surfactants and optionally, at least one zwitterionic compounds and an additive to change a characteristic of the fluid to which the foaming composition is added, where the resulting foam has improved stability and the additive has improved activity, optionally, the composition is environmentally friendly, biodegradable, produces no residual, and is resistant to high temperatures.

The present invention provides a foaming composition including a foaming agent comprising at least two cationic surfactants and optionally, at least one zwitterionic compounds and an additive to change a characteristic of the fluid to which the foaming composition is added, where the resulting foam has improved stability and the additive has improved activity, optionally, the composition is environmentally friendly, biodegradable, produces no residual, and is resistant to high temperatures.

The present invention provides a foaming composition including a foaming agent comprising a mixture or combination of at least one anionic surfactants and at least one cationic surfactants and optionally, at least one zwitterionic compounds and an additive to change a characteristic of the fluid to which the foaming composition is added, where the resulting foam has improved stability and the additive has improved activity, optionally, the composition is environmentally friendly, biodegradable, produces no residual, and is resistant to high temperatures.

The present invention provides a foaming composition including a foaming agent comprising a mixture or combination of at least two anionic surfactants, at least two zwitterionic compounds, at least one cationic surfactant and at least one nonionic surfactant and an additive to change a characteristic of the fluid to which the foaming composition is added, where the resulting foam has improved stability and the additive has improved activity, optionally, the composition is environmentally friendly, biodegradable, produces no residual, and is resistant to high temperatures.

The present invention provides a foaming composition including a foaming agent comprising at least two anionic ammonium alcohol ether sulfate surfactants and optionally, at least one zwitterionic compound, preferably a betaine, sulfobetaine, amino acids, a zwitterionic phospholipid, or mixture or combinations thereof and an additive to change a characteristic of the fluid to which the foaming composition is added, where the resulting foam has improved stability and the additive has improved activity, optionally, the composition is environmentally friendly, biodegradable, produces no residual, and is resistant to high temperatures.

The present invention provides a foaming composition including a foaming agent comprising at least two cationic bis quaternary ammonium halide surfactants and optionally, at least one zwitterionic compound, preferably a betaine, sulfobetaine, a zwitterionic phospholipid, or mixture or combinations thereof, optionally, an AOS as described herein, and an additive to change a characteristic of the fluid to which the foaming composition is added, where the resulting foam has improved stability and the additive has improved activity, optionally, the composition is environmentally friendly, biodegradable, produces no residual, and is resistant to high temperatures.

The present invention provides a foaming composition including a foaming agent comprising from about 15 to about 35 wt. % of a betaine containing solution, about 8 to about 16 wt. % of a first ammonium alcohol ether sulfate surfactant solution, and about 40 to about 60 wt. % of a second ammonium alcohol ether sulfate surfactant solution, with the balance being water and/or water and a freezing point depressant such as a glycol, an alcohol, a salt, mixtures thereof, or the like and sufficient amount of an additive to change a characteristic of the fluid to which the foaming composition is added, where the resulting foam has improved stability and the additive has improved activity.

The present invention provides a foaming composition including a foaming agent comprising from about 20 to about 30 wt. % of a betaine containing solution, about 10 to about 14 wt. % of a first ammonium alcohol ether sulfate surfactant solution and about 45 to about 55 wt. % of a second ammonium alcohol ether sulfate surfactant solution, with the balance being water and a sufficient amount of an additive to change a characteristic of the fluid to which the foaming composition is added, where the resulting foam has improved stability and the additive has improved activity.

The present invention also provides formulation including about 25 wt. % of a betaine containing solution, about 12 wt. % of a first ammonium alcohol ether sulfate surfactant solution and about 50 wt. % of a second ammonium alcohol ether sulfate surfactant solution with the balance being water and an additive to change a characteristic of the fluid to which the foaming composition is added, where the resulting foam has improved stability and the additive has improved activity.

The present invention also provides formulation including from about 40 wt. % to about 80 wt. % of a zwitterionic-containing foam composition including about 25 wt. % of a betaine containing solution, about 12 wt. % of a first ammonium alcohol ether sulfate surfactant solution and about 50 wt. % of a second ammonium alcohol ether sulfate surfactant solution, with the balance being water, from about 60 to about 20 wt. % of an AOS and from about 1 wt. % to about 15 wt. % methanol and a sufficient amount of an additive to change a characteristic of the fluid to which the foaming composition is to be added, where the resulting foam has improved stability and the additive has improved activity. A preferred formulation includes from about 45 wt. % to about 70 wt. % of the zwitterionic-containing foam composition, from about 55 wt. % to about 30 wt. % of the AOS, and from about 5 wt. % to about 10 wt. % methanol. A more preferred formulation includes from about 50 wt. % to about 60 wt. % of the zwitterionic-containing foam composition, from about 50 wt. % to about 40 wt. % of the AOS, and from about 5 wt. % to about 10 wt. % methanol. A particular preferred formulation includes about 55 wt. % of the zwitterionic-containing foam composition, about 45 wt. % of the AOS, and about 10 wt. % methanol.

The present invention also provides a composition of this invention diluted with a purified water including, without limitation, deionized water, osmotically purified water or water purified by any other technique known in the art.

The present invention also provided a composition of this invention diluted with a winterizing agent selected from the group consisting of glycols, cellosolve solvents from DOW, esters, formates, acetates, or any other freezing point depressant.

The present invention provides a method for foaming a fluid including the steps of adding to the fluid an foaming effective amount of a foaming composition of this invention in a single, multiple or continuation additions protocol depending on the requirements.

Foams

The present invention provides a foam including a fluid and an effective amount of a foam forming compositions to produce a foam, where the foam forming composition includes a foaming agent and an additive, where the additive is selected from the group consisting of noxious species scavengers, corrosion inhibitors, scale inhibitors, oxygen control agents, hydrocarbon accumulation agents and mixtures or combinations thereof, where the additive improves foaming characteristics of the foaming agent and/or where the foam improves the activity of the additive.

The present invention provides a foam including a fluid and an effective amount of a foam forming compositions to produce a foam, where the foam forming composition includes a foaming agent and a noxious species scavenger, where the scavenger improves foaming characteristics of the foaming agent, the scavenger converts noxious or corrosive species into more benign species and/or the foam improves an activity of the scavenger in converting the noxious or corrosive species into the more benign species.

The present invention provides a foam including a fluid and an effective amount of a foam forming compositions to produce a foam, where the foam forming composition includes a foaming agent and an additive, where the foaming agent comprises a surfactant, where the additive is selected from the group consisting of noxious species scavengers, corrosion inhibitors, scale inhibitors, oxygen control agents, hydrocarbon accumulation agents and mixtures or combinations thereof, where the additive improves foaming characteristics of the foaming agent and/or where the foam improves the activity of the additive.

The present invention provides a foam including a fluid and an effective amount of a foam forming compositions to produce a foam, where the foam forming composition includes a foaming agent and a noxious species scavenger, where the foaming agent comprises a surfactant, where the scavenger improves foaming characteristics of the foaming agent, where the scavenger converts noxious or corrosive species into more benign species and/or the foam improves an activity of the scavenger in converting the noxious or corrosive species into the more benign species.

The present invention provides a foam including a fluid and an effective amount of a foam forming compositions to produce a foam, where the foam forming composition includes a foaming agent and an additive, where the foaming agent is selected from the group consisting of a cationic surfactant, an anionic surfactant, a non-ionic surfactant, and mixtures or combinations thereof, where the additive is selected from the group consisting of noxious species scavengers, corrosion inhibitors, scale inhibitors, oxygen control agents, hydrocarbon accumulation agents and mixtures or combinations thereof, where the additive improves foaming characteristics of the foaming agent and/or where the foam improves the activity of the additive.

The present invention provides a foam including a fluid and an effective amount of a foam forming compositions to produce a foam, where the foam forming composition includes a foaming agent and a noxious species scavenger, where the foaming agent is selected from the group consisting of a cationic surfactant, an anionic surfactant, a non-ionic surfactant, and mixtures or combinations thereof, where the scavenger improves foaming characteristics of the foaming agent, where the scavenger converts noxious or corrosive species into more benign species and/or where the foam improves an activity of the scavenger in converting the noxious or corrosive species into the more benign species.

The present invention provides a foam including a fluid and an effective amount of a foam forming compositions to produce a foam, where the foam forming composition includes a foaming agent and an additive, where the foaming agent comprises at least one surfactant selected from the group consisting of a cationic surfactant, an anionic surfactant, a non-ionic surfactant, and mixtures or combinations thereof and at least one zwitterionic compound, where the additive is selected from the group consisting of noxious species scavengers, corrosion inhibitors, scale inhibitors, oxygen control agents, hydrocarbon accumulation agents and mixtures or combinations thereof, where the additive improves foaming characteristics of the foaming agent and/or where the foam improves the activity of the additive.

The present invention provides a foam including a fluid and an effective amount of a foam forming compositions to produce a foam, where the foam forming composition includes a foaming agent and a noxious species scavenger, where the foaming agent comprises at least one surfactant selected from the group consisting of a cationic surfactant, an anionic surfactant, an on-ionic surfactant, and mixtures or combinations thereof and at least one zwitterionic compound, where the scavenger improves foaming characteristics of the foaming agent, the scavenger converts noxious or corrosive species into more benign species and/or the foam improves an activity of the scavenger in converting the noxious or corrosive species into the more benign species.

Methods of Use

The present invention also provides a method including the steps of contacting a fluid with an effective amount of a foaming composition of this invention, where the amount is sufficient to form a foam, where the additive is selected from the group consisting of noxious species scavengers, corrosion inhibitors, scale inhibitors, oxygen control agents, hydrocarbon accumulation agents and mixtures or combinations thereof, where the additive improves properties of the foam and where the foam improves the activity of the additive.

The present invention also provides a method including the steps of contacting a fluid with a foam making effective amount of a foaming composition of this invention, contacting the foam with a foaming breaking amount of a defoaming to break the foam producing a two phase fluid system, separating the system into an organic phase and an aqueous phase, and repeating the previous three steps, where the foam making amount is sufficient to form a foam, where the additive is selected from the group consisting of noxious species scavengers, corrosion inhibitors, scale inhibitors, oxygen control agents, hydrocarbon accumulation agents and mixtures or combinations thereof, where the additive improves properties of the foam, and/or where the foam improves the activity of the additive and where the foam making amount may be zero in a given foam composition contacting step.

The present invention also provides a method including the steps of contacting a downhole fluid with an effective amount of a foaming composition of this invention to form a downhole foam, transporting the foam up hole, contacting the foam with an effective amount of a defoaming agent at a surface of the well to break the foam and form a two phase system, separating the aqueous phase including the foaming composition, adding a secondary amount of the foaming composition to the aqueous phase, and contacting the downhole fluid with the aqueous phase and repeating the previous four steps as desired, where the downhole foam reduces a weight of a fluid column allowing more fluid to be transported to the surface, the secondary amount is sufficient to reform the downhole foam and may be zero, where the foaming composition includes a foaming agent, a noxious species scavenger (hydrogen sulfide scavenger, carbon dioxide neutralizer, etc.) and optionally an additive selected from the group consisting of corrosion inhibitors, scale inhibitors, oxygen control agents, hydrocarbon accumulation agents and mixtures or combinations thereof, where the additive improves properties of the foam, and/or where the foam improves the activity of the additive.

The present invention provides a method for supply a foaming composition to a downhole fluid including the steps of inserting at least one fluid injector system into a well borehole to a desired depth and feeding, adding or injecting, via the system, an effective amount of a foaming composition of this invention, where the adding can be a single addition, multiple additions and/or continuous addition depending on requirements, where the amount is sufficient to achieve desired foamed fluid characteristics and to achieve desired reductions in adverse fluid components, properties, and/or characteristics such as noxious sulfur-containing species, other corrosive species, etc.

The present invention provides a method for supply a foaming composition to a downhole fluid including the steps of inserting at least one capillary fluid injector system into a well borehole to a desired depth such as a bottom of the well, and feeding, adding or injecting, via the system, an effective amount of a foaming composition of this invention, where the adding can be a single addition, multiple additions and/or continuous addition depending on the requirements, where the amount of foaming composition is sufficient to lighten a fluid column weight by converting the well fluids (water and hydrocarbons) to a foam so that the fluid column can be lifted more easily due to a lower pressure at the injection depth significantly improving a volume or quantity of gas and/or oil collected or produced from the well while reducing or lowering solids accumulations which tend to lower or kill gas production, and simultaneously to achieve desired reductions in adverse fluid components, properties, and/or characteristics such as noxious sulfur-containing species, other corrosive species, etc., where the foaming composition includes a foaming agent, a noxious species scavenger (hydrogen sulfide scavenger, carbon dioxide neutralizer, etc.) and optionally an additive selected from the group consisting of corrosion inhibitors, scale inhibitors, oxygen control agents, hydrocarbon accumulation agents and mixtures or combinations thereof, where the additive improves properties of the foam, and/or where the foam improves the activity of the additive.

The present invention provides a method for supply a foaming composition to a downhole fluid including the steps of: (a) inserting at least one coiled tubing or capillary coiled tubing into a well borehole to a desired depth, (b) feeding, adding or injecting a first effective amount of a foaming composition of this invention in via coiled tubing or capillary coiled tubing to form a foam, (c) collecting the foam at a production end of the well, (d) adding a foam breaking effective amount of a defoaming agent to the foam to break the foam forming an organic phase and an aqueous phase, (e) separating the aqueous phase, (f) adding a secondary amount of the foaming composition to reform a foam, which may be zero, (g) feeding, adding or injecting the aqueous phase via the coiled or capillary coiled tubing into the downhole fluid, and (h) repeating the steps b through f, where the foaming composition has improved foam characteristic due to the additive and the foam improves an activity of the additive while increasing productivity of the well.

The present invention provides a method for improving mass transport including the steps of: (a) injecting into a fluid or a stream of fluid according to an injection protocol an effective amount of a foaming composition of this invention; (b) forming a foam, where the additive is concentrated in bubble walls of the foam; and (c) converting a component of the fluid to a more benign component in the bubble walls, where the foaming composition has improved foam characteristic due to the additive and the foam improves an activity of the additive due to improved mass transport of fluid components into and out of the bubble walls while increasing productivity of the well.

DESCRIPTION OF THE DRAWINGS

The invention can be better understood with reference to the following detailed description together with the appended illustrative drawings in which like elements are numbered the same.

DETAILED DESCRIPTION OF THE INVENTION

Figure 1A:
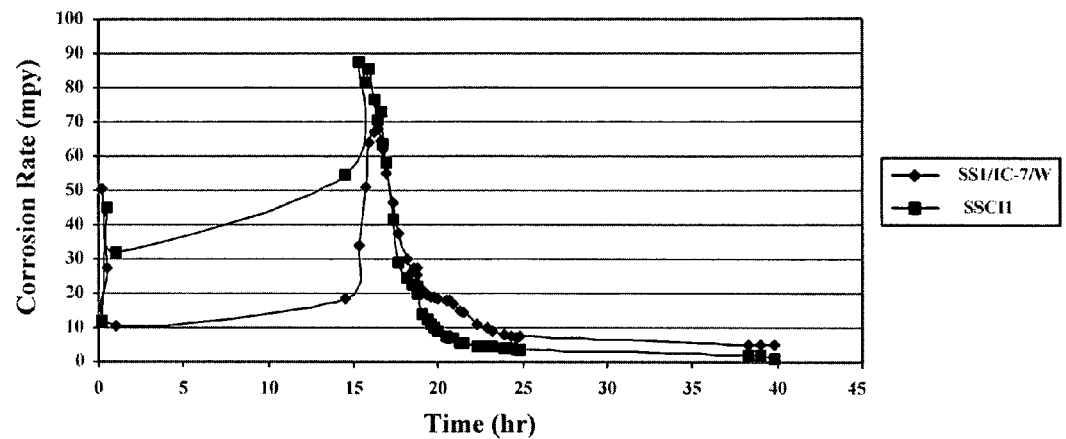
FIGS. 1A & B depicts plots of corrosion test data associated with the Corrosion Test 2.
Figure 1B:
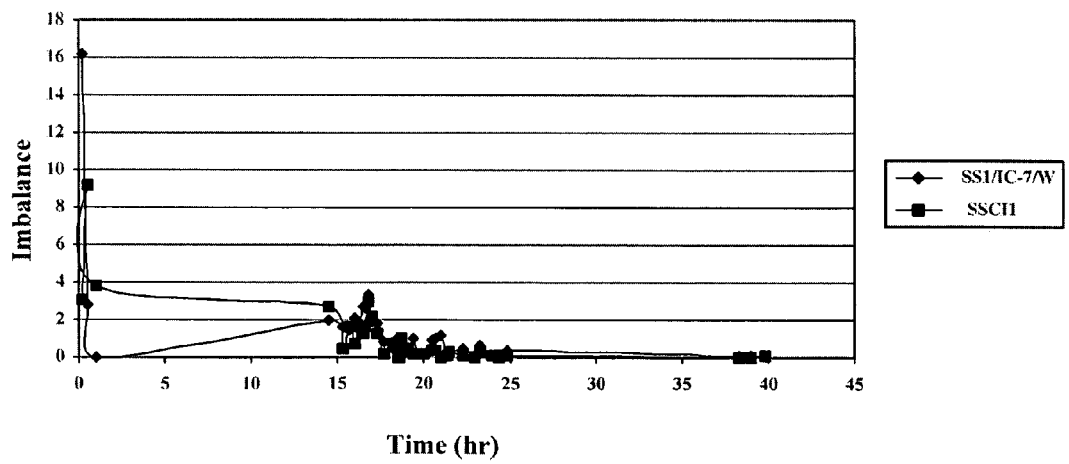

The inventors have found that novel multi-purpose foaming compositions can be prepared by combining a foaming agent with an additive designed to render noxious species benign or to change a characteristic of a fluid to which the composition is added, where the foam improves an activity of the additive and the additive improves properties or characteristics of the foam such as foam stability, foam height, etc.

The compositions of this invention can be made environmentally friendly, biodegradable, with low to no residuals, a near zero Zeta value, and high temperature stability or resistance to high temperatures. The properties of the foaming compositions can be modified for speciality applications through the addition of foam modifying agents such as low temperature agents such as winterizing and/or anti-freeze agents, foam boosters, solvents such as isopropyl alcohol (IPA), the sodium salts of short chain alpha olefin sulfonates (AOS), fatty acids (lauric acid, oleic acid, stearic acid, etc.) or other modifiers to modify or augment the basic characteristics of the foaming composition for a given application. The foaming compositions of this invention are ideally suited for drilling operations, especially underbalanced drilling operations, recyclable drilling operations, coiled tubing drilling and clean out operations, capillary coiled tubing (CCT) applications (foaming CCT production), any foam application where noxious and/or corrosive components need to be controlled, reduced or substantially eliminated or scale, oxygen and/or heavy hydrocarbon materials need to be controlled, recyclable foam drilling applications, well intervention service applications, well clean out applications, formation clean outs (fracturing or pumping foam into the formation to open formation for oil and/or gas production), reduce or control scale formation, increase or control heavy hydrocarbon, wax or asphaltene, dispersion, waste management applications (treatment of sewage and sludge) or similar applications. In unbalanced drilling operations, the foaming agent of this invention allows for the well fluid's hydrostatic head pressure to be reduced below that of the formation pressure by forming a foam that is then broken at the top of the well so that the well fluids and produced hydrocarbons can be separated and the well fluids refoamed, for continued operations, while allowing downhole control over the concentration of noxious and/or corrosive species or components in the well fluids.

The present invention broadly relates to a foaming composition including at least one foaming agent and at least one additive selected from the group consisting of noxious species scavengers, corrosion inhibitors, scale inhibitors, oxygen control agents, hydrocarbon accumulation agents and mixtures or combinations thereof, where the composition is adapted to produce a foam, where the additive improves foaming characteristics of the foaming agent and/or where the foam improves the activity of the additive.

Preferred foaming compositions of this invention include at least one surfactant selected from the group consisting of cationic surfactants, anionic surfactants, non-ionic surfactant and mixtures or combinations thereof, at least one additive selected from the group consisting of noxious species scavengers, corrosion inhibitors, scale inhibitors, oxygen control agents, hydrocarbon accumulation agents and mixtures or combinations thereof, optionally at least one zwitterionic agent and optionally at least one foam modifying agent.

Particularly preferred foaming compositions of this invention include at least one anionic surfactant, at least one additive selected from the group consisting of noxious species scavengers, corrosion inhibitors, scale inhibitors, oxygen control agents, hydrocarbon accumulation agents and mixtures or combinations thereof, optionally at least one zwitterionic agent and optionally at least one foam modifying agent, where the anionic surfactants are selected from the group consisting of ammonium alkyl alcohol ether sulfate surfactants, alkylated phenol ether sulfate surfactants or mixtures or combinations thereof and the zwitterionic agent is selected from the group consisting of alkylated amino acids (naturally occurring or synthetic) where the nitrogen atom bears four substituents and bears a formal positive charge such as betaines, other alkylated di and poly amino acids where one or all of the nitrogen atom bear four substituents and bear formal positive charges, or mixtures or combinations thereof. The present invention is also useful as a polymer free foaming composition for use when drilling through shales, where the foaming compositions of this invention shows superior foam integrity without the need for polymer additives.

The present invention broadly relates to a method for foaming fluids including the step of adding an effective amount of a foaming composition of this invention to a fluid to result is a foamed fluid. The foamed fluid can be used in drilling, recyclable drilling, well intervention operations and well clean out operations, coiled tubing drilling, recyclable drilling and well clean out operations, capillary coiled tubing (CCT) operations, CCT clean out operations, recycle foaming and foaming operations or other similar types of operations. The method can also include the step of breaking the foam with the addition of an effective amount of a defoamer to recover the fluid. The method can also include repeating the adding or foam making step and foam breaking step continuously or over a set period of time. The repeated application of the foaming and defoaming steps is called a recycle method.

Suitable Reagents

Suitable anionic surfactants include, without limitation, anionic sulfate surfactant, alkyl ether sulfonates, alkylaryl sulfonates, or mixture or combinations. Preferred sodium or ammonium alcohol ether sulfate surfactants include those having the general formula $R^1O$—$(CH_2CH_2O)_nSO_3NH_4$, where $R^1$ is a carbon-containing group including an alkyl group, an aryl group, an alkaryl group, an aralkyl group or mixture thereof. Particularly preferred sodium or ammonium alcohol ether sulfate surfactants include short chain sodium or ammonium alcohol ether sulfate surfactants having between 2 and about 10 carbon atoms, especially, between about 4 and 10 carbon atoms and long chain sodium or ammonium alcohol ether sulfate surfactants having between about 10 to about 24 carbon atoms, more particularly, between about 12 and about 18 carbon atoms, especially, between about 12 and about 14 carbon atoms. The sodium ammonium alcohol ether sulfate surfactants are prepared by reacting 1 to 10 moles of ethylene oxide per mole of alkanol, preferred, are prepared by reacting 3 moles of ethylene oxide per mole of alkanol.

Preferred alkylaryl sulfonates including, without limitation, alkyl benzene sulfonic acids and their salts, dialkylbenzene disulfonic acids and their salts, dialkylbenzene sulfonic acids and their salts, alkyltoluene/alkyl xylene sulfonic acids and their salts, alkylnaphthalene sulfonic acids/condensed alkyl naphthalene sulfonic acids and their salts, alkylphenol sulfonic acids/condensed alkylphenol sulfonic acids and their salts, or mixture or combinations thereof.

Preferred alkyl ether sulfonates including, without limitation, alkyl ether sulfonates having the general formula $R^2[-(O-R^3O)m-(R^4O)n-(R^5)]_y$, where: $R^2$=alkyl, alkenyl, amine, alkylamine, dialkylamine, trialkylamine, aromatic, polyaromatic, cycloalkane, cycloalkene, $R^3$, $R^4$=$C_2H_4$ or $C_3H_6$ or $C_4H_8$, $R^4$=linear or branched $C_7H_{14}SO_3X$ to $C_{30}H_{60}SO_3X$ when y=1, $R^5$=linear or branched $C_7H_{14}SO_3X$ to $C_{30}H_{60}SO_3X$ or H when y>1 but at least one $R^4$ must be linear or branched $C_7H_{14}SO_3X$ to $C_{30}H_{60}SO_3X$, M is greater or equal to 1, n is greater or equal to 0, n+m=1 to 30+, y is greater or equal to 1, X=alkali metal or alkaline earth metal or ammonium or amine.

Suitable cationic surfactants include, without limitation, any cationic surfactant such as monocarbyl ammonium salts, dicarbyl ammonium salts, tricarbyl ammonium salts, monocarbyl phosphonium salts, dicarbyl phosphonium salts, tricarbyl phosphonium salts, carbylcarboxy salts, quaternary ammonium salts, imidazolines, ethoxylated amines, quaternary phospholipids, gemini, bis or diquaternary ammonium surfactants such as bis quaternary ammonium halides of bis halogenated ethane, propane, butane or higher halogenated alkanes, e.g., dichloroethane or dibromoethane, or bis halogenated ethers such as dichloroethylether(DCEE). Preferred bis quaternary ammonium halides are prepared from substituted dimethyl tertiary amines, where the substituent includes between about 4 and about 30 carbon atoms, preferably, between about 6 and about 24 carbon atoms, and particularly, between about 8 and about 24 carbon atoms, and where one or more of the carbon atoms can be replace by an oxygen atom in the form of an ether and/or hydroxyl moiety and/or a nitrogen atom is the form of an amido moiety. Particularly preferred bis quaternary ammonium halides hydrocarbons are prepared from naturally occurring acids, such as fatty acids, synthetic acids, modified naturally occurring acids, or mixture or combinations thereof. Preferred naturally occurring acids are those found in naturally occurring oils such as coconut oil, palm oil, palm kernel oil, soya, safflower oil, sunflower oil, peanut oil, canola oil, or from animal such as tallow oil and its derivatives. Preferred bis quaternary ammonium halides are prepared from disubstituted methyltertiaryamines, where the substituents include between about 4 and about 30 carbon atoms, preferably, between about 6 and about 24 carbon atoms, and particularly, between about 8 and about 24 carbon atoms, and where one or more of the carbon atoms can be replace by an oxygen atom in the form of an ether and/or hydroxyl moiety and/or a nitrogen atom is the form of an amido moiety, such as amidopropyltertiary amines, derived from the reaction of dimethyl aminopropylamine(DMAPA) or similar terminated primary-tertiary diamines, reacted with the above mentioned oils or their corresponding fatty acids, or hydroxy acids. Other preferred cationic surfactants are dimer acids or anhydrides including alkylsubstituted maleic anhydride, alkylsubstituted diethylmalonic acid, or alkylsubstituted higher diacids such as azelaic acid (C9), trimer acids as NTA(nitriloacetic acid), and aconitic acid and trimetellic anhydride are useful though producting a higher trimer the tertiary amine may be accomplished by reaction of a diamine with a fatty acid or oil, reacting with one amine and then converting the other primary amine to tertiary by the addition of tetrahydrofuran, ethylene oxide, propylene oxide, butylene oxide, epichlorohydrin, or the like and further where the terminal hydrogens of the primary amine can be alkylated using formaldehyde/formic acid mixtures.

Suitable non-ionic surfactants include, without limitation, polyglycols comprising polymers of ethylene oxide (EO), propylene oxide (PO), and/or butylene oxide (BO), polyethyleneoxide polymers such as alcohol ethoxylates and the alkylphenol ethoxylates, alkyl polyglycosides, sorbitan ester surfactants, distribution of the polyoxyethylene chain, polyoxyethylene alkylphenols, polyoxyethylene alcohols, polyoxyethylene esters of fatty acids, polyoxyethylene mercaptans, polyoxyethylene alkylamines, nonionic surfactants containing an amide group, polyol ester surfactants, and mixtures or combinations thereof.

Suitable zwitterionic compounds include, without limitation: (1) any compound having the general structure $R^6, R^7, R^8N^+$—$R^9$—$CO_2^-$, where $R^6$, $R^7$, and $R^8$ are the same or different carbon-containing group, amido carbon-containing group, ether carbon-containing group, or mixtures thereof, and $R^9$ is an alkenyl group, alkenyloxide group or mixtures thereof; (2) any compound having the general structure $R^{10}(R^7, R^8N^+$—$R^9$—$CO_2^-)_n$, where $R^7$ and $R^8$ are the same or different carbon-containing group, amido carbon-containing group, ether carbon-containing group, or mixtures thereof, $R^9$ is an alkenyl group, alkenyloxide group or mixtures thereof, and $R^{10}$ is a multivalent substituent having a valency n between 2 and about 6, e.g., $CH_2$ moiety when n is 2, a CH moiety when n is 3 and a C atom when n is 4; (3) any compound having the general structure $R^{12}$—C(O)—N $(R^{11})$—$R^{13}$—$N^+(R^7,R^8)$—$R^9$—$CO_2^-$, where $R^7, R^8, R^{11}$ and $R^{12}$ are the same or different carbon-containing group, amido carbon-containing group, ether carbon-containing group, or mixtures thereof, and $R^9$ and $R^{13}$ are the same or different alkenyl group, alkenyloxide group or mixtures thereof; (4) any compound having the general structure $R^{14}$—$[R^{15}$—C (O)—$N(R^{11})$—$R^{13}$—$N^+(R^7,R^8)$—$R^9$—$CO_2^-]m$, where $R^7$, $R^8$ and $R^{11}$ are the same or different carbon-containing group, amido carbon-containing group, ether carbon-containing group, or mixtures thereof, $R^9$, $R^{13}$ and $R^{15}$ are the same or different alkenyl group, alkenyloxide group or mixtures thereof and $R^{14}$ is a multivalent substituent having a valency m between 2 and about 6; other similar ammonium acid zwitterionic agent; or mixtures or combinations thereof. Preferred zwitterionic compounds are betaines such as cocamidopropyl betaine, 5-(1-piperidinomethyl)-1H-tetrazolide, or similar zwitterionic compounds. Other zwitterionic compounds for use in this invention include, without limitation, phospholipids capable of assuming a zwitterionic state such as phosphatidylcholine, phosphatidylserine, phosphatidylethanolamine, sphingomyelin and other ceramides, as well as various other zwitterionic phospholipids. Preferred sulfo-betaines and related zwitterionic compounds include, without limitation, N-Decyl-N,N-dimethyl-3-ammonio-1-propanesulfonate; Dimethylbenzyl-(3-sulfopropyl)ammonium; Dimethylethyl-(3-sulfopropyl)ammonium; Dimethyl-(2-hydroxyethyl)-(3-sulfopropyl)ammonium; 4-n-Hexylbenzoylamido-propyl-dimethylammoniosulfobetaine; -Methyl-N-(3-sulfopropyl)morpholinium; 4-n-Octylbenzoylamido-propyl-dimethylammoniosulfobetaine; 1-(3-Sulfopropyl) pyridium; N-Tetradecyl-N,N-Dimethyl-3-Ammonio-1-Propanesulfonate, or the like or mixtures or combination thereof.

Suitable winterizing agents include, without limitation, formate salts such as lithium formate, sodium formate, potassium formate, cesium formate, triethanolamine formate, or the like, or acetates such as potassium acetate, cesium acetate, ammonium acetate, triethanolamine acetate, or the like or mixtures or combinations.

Suitable foam boosters include, without limitation, cellosolves of the general formula $R^9OCH_2CH_2OH$ where $R^9$ is an alkyl group having between about 2 and about 8 carbon atoms or the like or mixtures or combinations. A preferred cellosolve is butylcellosolve. It should recognized by ordinary artisans that cellosolves are not considered environmentally friendly under all condition. Some of the cellosolves are toxic to mammals, but are not toxic to algae, bacteria or other microorganisms and are 80% or more biodegradable. Thus, environmentally friendly and biodegradable do not mean that every component in each formulation is environmentally friendly under all conditions or totally biodegradable, but that compared to many competitive foaming agents, the foaming agents of this invention have superior biodegradability and environmentally friendliness.

Suitable anti-freeze agents include, without limitation, alcohols, glycols, glycerols, or other freezing point depressing agents or the like or mixtures or combinations.

Suitable solvents include, without limitation, water, alcohols, ethers, esters or mixtures or combinations thereof. Preferred alcohols include, without limitation, methanol, ethanol, isopropanol, propanol, or the like or mixtures or combinations. Preferred ether include, without limitation, dimethyl ether, diethyl ether, dipropyl ether, methylethyl ether, methylpropyl ether, ethylpropyl ether, or the like or mixture or combinations thereof. Preferred esters include, without limitation, ethyl Ethyl Acetate, -butyl Acetate, Ester Solvent EEP, Glycol Ether EB Acetate, or the like, propylene Based Glycol Ethers or the like, or mixtures or combinations thereof.

Suitable sodium salts of alpha olefin sulfonates (AOSs), include, without limitation, any alpha olefin sulfonate. Preferred AOSs including short chain alpha olefin sulfonates having between about 2 and about 10 carbon atoms, particularly, between 4 and 10 carbon atoms, longer chain alpha olefin sulfonates having between about 10 and about 24 carbon atoms, particularly, between about 10 and 16 carbon atoms or mixtures or combinations thereof.

Suitable foam modifiers that can be used in place of or in conjunction with AOS include, without limitation, cyclamic acid salts such as sodium (cyclamate), potassium, or the like, salts of sulfonated methyl esters having between about 12 and about 22 carbon atoms, where the salt is sodium, potassium, ammonium, alkylammonium, 2-aminoethanesulfonic acid (taurine) or the like such as Alpha-Step MC-48 from Stepan Corporation. Other additives includes salts of 2-aminoethane sulfonic acids, where the salt is an alkali metal, ammonium, alkylammonium, or like counterions.

Suitable fatty acids include, without limitation, lauric acid, oleic acid, stearic acid or the like or mixtures or combinations.

Suitable foam enhancers include, without limitation, a foam enhancer selected from the group consisting of a linear dodecyl benzene sulfonic acid salt, a sarcosinate salt, and mixtures or combinations thereof. Preferred linear dodecyl benzene sulfonic acid salt include, without limitation, ammonium linear dodecyl benzene sulfonic acid, alkylammonium linear dodecyl benzene sulfonic acid, alkanolamine ammonium linear dodecyl benzene sulfonic acid, lithium linear dodecyl benzene sulfonic acid, sodium linear dodecyl benzene sulfonic acid, potassium, cesium linear dodecyl benzene sulfonic acid, calcium linear dodecyl benzene sulfonic acid, magnesium linear dodecyl benzene sulfonic acid and mixtures or combinations thereof. Preferred sarcosinates include, without limitation, sodium lauryl sarcosinate, potassium lauryl sarcosinate, HAMPOSYL N-Acyl Sarcosinate Surfactants, Sodium N-Myristoyl Sarcosinate, and mixtures or combinations thereof.

Suitable sulfur scavengers for use in the compositions of this invention include, without limitation, any compound capable of reacting with hydrogen sulfide, mercaptans, alkyl di and polysulfides and converting them to more benign sulfur-containing compounds. Preferred sulfur scavengers include amines, reaction products of aldehydes or aldehyde donors and amines or amine donors such as imines, triazines, amine-aldehyde polymers, etc., or any other compound capable of reaction with noxious sulfur-containing species such as hydrogen sulfide, thiols, etc. or mixtures or combinations thereof.

Scale Control

Suitable additives for Scale Control and useful in the compositions of this invention include, without limitation: Chelating agents, e.g., Na, K or $NH_4^+$ salts of EDTA; Na, K or $NH_4^+$ salts of NTA; Na, K or $NH_4^+$ salts of Erythorbic acid; Na, K or $NH_4^+$ salts of thioglycolic acid (TGA); Na, K or $NH_4^+$ salts of Hydroxy acetic acid; Na, K or $NH_4^+$ salts of Citric acid; Na, K or $NH_4^+$ salts of Tartaric acid or other similar salts or mixtures or combinations thereof. Suitable additives that work on threshold effects, sequestrants, include, without limitation: Phosphates, e.g., sodium hexamethylphosphate, linear phosphate salts, salts of polyphosphoric acid, Phosphonates, e.g., nonionic such as HEDP (hydroxyethylidene diphosphoric acid), PBTC (phosphoisobutane, tricarboxylic acid), Amino phosphonates of: MEA (monoethanolamine), $NH_3$, EDA (ethylene diamine), Bishydroxyethylene diamine, Bisaminoethylether, DETA (diethylenetriamine), HMDA (hexamethylene diamine), Hyper homologues and isomers of HMDA, Polyamines of EDA and DETA, Diglycolamine and homologues, or similar polyamines or mixtures or combinations thereof; Phosphate esters, e.g., polyphosphoric acid esters or phosphorus pentoxide ($P_2O_5$) esters of: alkanol amines such as MEA, DEA, triethanol amine (TEA), Bishydroxyethylylene diamine; ethoxylated alcohols, glycerin, glycols such as EG (ethylene glycol), propylene glycol, butylene glycol, hexylene glycol, trimethylol propane, pentaerythrol, neopentyl glycol or the like; Tris & Tetra hydroxy amines; ethoxylated alkyl phenols (limited use due to toxicity problems), Ethoxylated amines such as monoamines such as MDEA and higher amines from 2 to 24 carbons atoms, diamines 2 to 24 carbons carbon atoms, or the like; Polymers, e.g., homopolymers of aspartic acid, soluble homopolymers of acrylic acid, copolymers of acrylic acid and methacrylic acid, terpolymers of acylates, AMPS, etc., hydrolyzed polyacrylamides, poly malic anhydride (PMA); or the like; or mixtures or combinations thereof.

Corrosion Inhibitors

Suitable additives for Corrosion Inhibition and for use in the compositions of this invention include, without limitation: quaternary ammonium salts e.g., chloride, bromides, iodides, dimethylsulfates, diethylsulfates, nitrites, hydroxides, alkoxides, or the like, or mixtures or combinations thereof; salts of nitrogen bases; or mixtures or combinations thereof. Exemplary quaternary ammonium salts include, without limitation, quaternary ammonium salts from an amine and a quaternerization agent, e.g., alkylchlorides, alkylbromide, alkyl iodides, alkyl sulfates such as dimethyl sulfate, diethyl sulfate, etc., dihalogenated alkanes such as dichloroethane, dichloropropane, dichloroethyl ether, epichlorohydrin adducts of alcohols, ethoxylates, or the like; or mixtures or combinations thereof and an amine agent, e.g., alkylpyridines, especially, highly alkylated alkylpyridines, alkyl quinolines, C6 to C24 synthetic tertiary amines, amines derived from natural products such as coconuts, or the like, dialkyl substituted methyl amines, amines derived from the reaction of fatty acids or oils and polyamines, amidoimidazolines of DETA and fatty acids, imidazolines of ethylenediamine, imidazolines of diaminocyclohexane, imidazolines of aminoethylethylenediamine, pyrimidine of propane diamine and alkylated propene diamine, oxyalkylated mono and polyamines sufficient to convert all labile hydrogen atoms in the amines to oxygen containing groups, or the like or mixtures or combinations thereof. Exemplary examples of salts of nitrogen bases, include, without limitation, salts of nitrogen bases derived from a salt, e.g.: C1 to C8 monocarboxylic acids such as formic acid, acetic acid, propanoic acid, butanoic acid, pentanoic acid, hexanoic acid, heptanoic acid, octanoic acid, 2-ethylhexanoic acid, or the like; C2 to C12 dicarboxylic acids, C2 to C12 unsaturated carboxylic acids and anhydrides, or the like; polyacids such as diglycolic acid, aspartic acid, citric acid, or the like; hydroxy acids such as lactic acid, itaconic acid, or the like; aryl and hydroxy aryl acids; naturally or synthetic amino acids; thioacids such as thioglycolic acid (TGA); free acid forms of phosphoric acid derivatives of glycol, ethoxylates, ethoxylated amine, or the like, and aminosulfonic acids; or mixtures or combinations thereof and an amine, e.g.: high molecular weight fatty acid amines such as cocoamine, tallow amines, or the like; oxyalkylated fatty acid amines; high molecular weight fatty acid polyamines (di, tri, tetra, or higher); oxyalkylated fatty acid polyamines; amino amides such as reaction products of carboxylic acid with polyamines where the equivalents of carboxylic acid is less than the equivalents of reactive amines and oxyalkylated derivatives thereof; fatty acid pyrimidines; monoimidazolines of EDA, DETA or higher ethylene amines, hexamethylene diamine (HMDA), tetramethylenediamine (TMDA), and higher analogs thereof; bisimidazolines, imidazolines of mono and polyorganic acids; oxazolines derived from monoethanol amine and fatty acids or oils, fatty acid ether amines, mono and bis amides of aminoethylpiperazine; GAA and TGA salts of the reaction products of crude tall oil or distilled tall oil with diethylene triamine; GAA and TGA salts of reaction products of dimer acids with mixtures of poly amines such as TMDA, HMDA and 1,2-diaminocyclohexane; TGA salt of imidazoline derived from DETA with tall oil fatty acids or soy bean oil, canola oil, or the like; or mixtures or combinations thereof.

Carbon Dioxide Neutralization

Suitable additives for $CO_2$ neutralization and for use in the compositions of this invention include, without limitation, MEA, DEA, isopropylamine, cyclohexylamine, morpholine, diamines, dimethylaminopropylamine (DMAPA), ethylene diamine, methoxy propylamine (MOPA), dimethylethanol amine, methyldiethanolamine (MDEA) & oligomers, imidazolines of EDA and homologues and higher adducts, imidazolines of aminoethylethanolamine (AEEA), aminoethylpiperazine, aminoethylethanol amine, di-isopropanol amine, DOW AMP-90™, Angus AMP-95, dialkylamines (of methyl, ethyl, isopropyl), mono alkylamines (methyl, ethyl, isopropyl), trialkyl amines (methyl, ethyl, isopropyl), bishydroxyethylethylene diamine (THEED), or the like or mixtures or combinations thereof.

Paraffin Control

Suitable additives for Paraffin Removal, Dispersion, and/or paraffin Crystal Distribution include, without limitation: Cellosolves available from DOW Chemicals Company; Cellosolve acetates; Ketones; Acetate and Formate salts and esters; surfactants composed of ethoxylated or propoxylated alcohols, alkyl phenols, and/or amines; methylesters such as coconate, laurate, soyate or other naturally occurring methylesters of fatty acids; sulfonated methylesters such as sulfonated coconate, sulfonated laurate, sulfonated soyate or other sulfonated naturally occurring methylesters of fatty acids; low molecular weight quaternary ammonium chlorides of coconut oils soy oils or C10 to C24 amines or monohalogenated alkyl and aryl chlorides; quanternary ammonium salts composed of disubstituted (e.g., dicoco, etc.) and lower molecular weight halogenated alkyl and/or aryl chlorides; gemini quaternary salts of dialkyl (methyl, ethyl, propyl, mixed, etc.) tertiary amines and dihalogenated ethanes, propanes, etc. or dihalogenated ethers such as dichloroethyl ether (DCEE), or the like; gemini quaternary salts of alkyl amines or amidopropyl amines, such as cocoamidopropyldimethyl, bis quaternary ammonium salts of DCEE; or mixtures or combinations thereof. Suitable alcohols used in preparation of the surfactants include, without limitation, linear or branched alcohols, specially mixtures of alcohols reacted with ethylene oxide, propylene oxide or higher alkyleneoxide, where the resulting surfactants have a range of HLBs. Suitable alkylphenols used in preparation of the surfactants include, without limitation, nonylphenol, decylphenol, dodecylphenol or other alkylphenols where the alkyl group has between about 4 and about 30 carbon atoms. Suitable amines used in preparation of the surfactants include, without limitation, ethylene diamine (EDA), diethylenetriamine (DETA), or other polyamines. Exemplary examples include Quadrols, Tetrols, Pentrols available from BASF. Suitable alkanolamines include, without limitation, monoethanolamine (MEA), diethanolamine (DEA), reactions products of MEA and/or DEA with coconut oils and acids.

Oxygen Control

The introduction of water downhole often is accompanied by an increase in the oxygen content of downhole fluids due to oxygen dissolved in the introduced water. Thus, the materials introduced downhole must work in oxygen environments or must work sufficiently well until the oxygen content has been depleted by natural reactions. For system that cannot tolerate oxygen, then oxygen must be removed or controlled in any material introduced downhole. The problem is exacerbated during the winter when the injected materials include winterizers such as water, alcohols, glycols, Cellosolves, formates, acetates, or the like and because oxygen solubility is higher to a range of about 14-15 ppm in very cold water. Oxygen can also increase corrosion and scaling. In CCT (capillary coiled tubing) applications using dilute solutions, the injected solutions result in injecting an oxidizing environment ($O_2$) into a reducing environment ($CO_2$, $H_2S$, organic acids, etc.).

Options for controlling oxygen content includes: (1) deaeration of the fluid prior to downhole injection, (2) addition of normal sulfides to product sulfur oxides, but such sulfur oxides can accelerate acid attack on metal surfaces, (3) addition of erythorbates, ascorbates, diethylhydroxyamine or other oxygen reactive compounds that are added to the fluid prior to downhole injection; and (4) addition of corrosion inhibitors or metal passivation agents such as potassium (alkali) salts of esters of glycols, polyhydric alcohol ethyloxylates or other similar corrosion inhibitors. Exemplary examples oxygen and corrosion inhibiting agents include mixtures of tetramethylene diamines, hexamethylene diamines, 1,2-diaminecyclohexane, amine heads, or reaction products of such amines with partial molar equivalents of aldehydes. Other oxygen control agents include salicylic and benzoic amides of polyamines, used especially in alkaline conditions, short chain acetylene diols or similar compounds, phosphate esters, borate glycerols, urea and thiourea salts of bisoxalidines or other compound that either absorb oxygen, react with oxygen or otherwise reduce or eliminate oxygen.

Compositional Ranges

The novel and multi-purpose foaming compositions of this invention are comprised of one or more foaming agents and one or more fluid property modification agents, agents that modify a chemical and/or physical property or characteristic of fluids or fluid streams (single phased or multi-phased), where the properties or characteristics include reducing, reducing below a desired level or substantially eliminating noxious species (e.g., $H_2S$, $CO_2$, thiols, etc.) or converting noxious species into more benign or benign species.

One preferred compositional range of the compositions of this invention include:

(a) generally, from about 20 wt. % to about 80 wt. % of one or more foaming agents and from about 80 wt. % to about 20 wt. % of one or more fluid property modification agents;

(b) preferably, from about 30 wt. % to about 70 wt. % of one or more foaming agents and from about 70 wt. % to about 30 wt. % of one or more fluid property modification agents;

(c) particularly, from about 40 wt. % to about 60 wt. % of one or more foaming agents and from about 60 wt. % to about 40 wt. % of one or more fluid property modification agents; and (d) especially, from about 45 wt. % to about 55 wt. % of one or more foaming agents and from about 55 wt. % to about 45 wt. % of one or more fluid property modification agents;

Another preferred compositional range of the compositions of this invention include:

(a) generally, from about 15 wt. % to about 50 wt. % of one or more foaming agents, from about 15 wt. % to about 50 wt. % of one or more fluid property modification agents and from about 15 wt. % to about 50 wt. % of a purified water;

(b) preferably, from about 20 wt. % to about 50 wt. % of one or more foaming agents, from about 20 wt. % to about 50 wt. % of one or more fluid property modification agents and from about 20 wt. % to about 50 wt. % of a purified water;

(c) particularly, from about 25 wt. % to about 45 wt. % of one or more foaming agents, from about 25 wt. % to about 45 wt. % of one or more fluid property modification agents and from about 25 wt. % to about 45 wt. % of a purified water; and (d) especially, from about 30 wt. % to about 40 wt. % of one or more foaming agents, from about 30 wt. % to about 40 wt. % of one or more fluid property modification agents and from about 30 wt. % to about 40 wt. % of a purified water.

EXPERIMENTAL SECTION

In all of the examples for making the foaming compositions described below, after all addition and mixing steps are completed, the final composition is filtered through a 1 μm filter to remove any solid residues and/or salts.

Former Preparation

Example 1

This example illustrates the preparation of a preferred general purpose foaming agent for use in a preferred multi-purpose foaming compositions of this invention.

To a 1000 gallon reactor was charged 1,024.94 lbs of deionized or reverse osmosis purified water or other purified waters, 1844.60 lbs of a cocamidopropylbetaine solution, Alpha 2442 Base available from Clearwater International, LLC of Houston, Tex., 922.30 lbs of Base 610-3.5 (85%) available from Clearwater International, LLC of Houston, Tex., an ammonium alcohol ether sulfate, and 3633.15 lbs of Base Hexyl-3.0 (90 wt. %) available from Clearwater International, LLC of Houston, Tex., another ammonium alcohol ether sulfate. The ingredients were added in the order shown. The Base 610-3.5 was heated and stirred prior to addition. The mixture was blended in the reactor for about 1 hour. The temperature of the mixture was then raised to between about 100° F. and about 120° F., which may be accomplished by preheating the Base Hexyl-3.0 (90 wt. %) and the Base 610-3.5 (85 wt. %). This composition is referred to herein as F1. F1 was then tested and had the properties listed in Table I.

TABLE I

Product Properties

| Property | Value | Property | Value |
|---|---|---|---|
| specific gravity | 1.095 g/mL | pour point | −16° C. |
| appearance | clear liquid | color | amber-gold |
| initial ¼ Life[a] | 5:53 minutes | initial ½ Life[b] | 8:45 minutes |

[a]add 100 mL of tap water to Hamilton Beach Malt mixer add 3.0 grams of foamer, blend at high speed for 30 to 60 seconds, pour into 500 mL graduated cylinder, measure time to get 25 mL of liquid in graduated cylinder.

Example 2

This example illustrates the preparation of several other foamers used for comparative purposes. The foamers were prepared in accordance with the general procedure of Example 1. The foamer compositions and designations are given in Table II.

TABLE II

Foamer Compositions and Designations Used Herein

| Component | F2 | F3 | F4 | F5 |
|---|---|---|---|---|
| F1 | 45 | | | 50 |
| OFB | 45 | 100 | 40 | |
| FS | | | | 50 |
| W | 10 | | 20 | 10 |
| NE | | | 10 | |
| FWF | | | 30 | |
| Total | 100 | 100 | 100 | 110 |

OFB—Oil Foam Booster;
FS—Foam Stabilizer;
W—Winterizer;
NE—Non-emulsifier;
FWF—Fresh Water Foamer Other foamers used to illustrate the utility of this invention include F6, CWF 311 RC available from Clearwater International, LLC 4420 S. Flores Road, Elmendorf, Tex. 78112.

Multi-Purpose Foaming Composition Preparations

Example 3

This example illustrates the preparation of a preferred multi purpose foaming composition of this invention using the foaming agent of Example 1 in a 1:1:1 ratio with a sulfur scavenger and purified water, referred to herein as FC1 [F1/SS1/DI (33/33/33)].

To a stirred reactor was charged 2,484.04 lbs of DI (deionized water) with stirring. 2,410.98 lbs of SS1 (WEC 9802), a triazine sulfur scavenger available from Clearwater International, LLC, 4420 S. Flores Road, Elmendorf, Tex. 78112, was added with mixing. To this solution was added 2410.98 lbs of F1 of example 1 with mixing. The mixture was blended in the reactor for about ½ hours. The foaming composition FC1 was then tested and had the properties listed in Table III.

TABLE III

Product Properties

| Property | Value | Property | Value |
|---|---|---|---|
| Specific Gravity | 1.063 g/mL | Density | 8.86 lbs/gal |
| Foam Height | 600+ | pH | 9.94 |
| ¼ Life[a] | 5:50 minutes | appearance | clear liquid |
| ½ Life[b] | 9:02 minutes | color | medium yellow |

[a]add 100 mL of tap water to Hamilton Beach Malt mixer add 1.5 grams of foamer, blend at high speed for 60 s, pour into 500 mL graduated cylinder, measure time to get 25 mL of liquid in graduated cylinder;
[b]measure time to get 50 mL of liquid in graduated cylinder.

Example 4

This example illustrates the preparation of a preferred multi purpose foaming composition of this invention using the foaming agent of Example 1 in a 1:1 ratio with a sulfur scavenger, referred to herein as FC2 [F1/SS1 (50/50)].

To a stirred reactor was charged 2,410.98 lbs of SS1 (WEC 9802), a triazine sulfur scavenger available from Clearwater International, LLC, 4420 S. Flores Road, Elmendorf, Tex. 78112, with mixing. To this solution was added 2410.98 lbs of F1 of example 1 with mixing. The mixture was blended in the reactor for about 1 hours.

Example 5

This example illustrates the preparation of a preferred multi purpose foaming composition of this invention using the foaming agent of Example 1 in a 1:1:1 ratio with a sulfur scavenger and purified water, referred to herein as FC3 [F1/SS2/DI (33/33/33)].

To a stirred reactor was charged 2,484.04 lbs of deionized water with stirring. 2,410.98 lbs of SS2 (WEC 9801), a triazine sulfur scavenger available from Clearwater International, LLC, 4420 S. Flores Road, Elmendorf, Tex. 78112, was added with mixing. To this solution was added 2410.98 lbs of F1 of example 1 with mixing. The mixture was blended in the reactor for about ½ hours.

Example 6

This example illustrates the preparation of a preferred multi purpose foaming composition of this invention using the foaming agent of Example 1 in a 1:1 ratio with a sulfur scavenger, referred to herein as FC4 [F1/SS2 (50/50)].

To a stirred reactor was charged 2,410.98 lbs of SS2 (WEC 9801), a triazine sulfur scavenger available from Clearwater International, LLC, 4420 S. Flores Road, Elmendorf, Tex. 78112, with mixing. To this solution was added 2410.98 lbs of F1 of example 1 with mixing. The mixture was blended in the reactor for about ½ hours.

Example 7

This example illustrates the preparation of a preferred multi purpose foaming composition of this invention using the foaming agent of Example 1 and a sulfur scavenger, referred to herein as FC5 [F6/SS1/DI (33.3/33.3/33.3)].

To a stirred reactor was charged 33.3 wt. % of DI (deionized water), followed by 33.3 wt. % of SS1 (WEC 9802), a triazine sulfur scavenger available from Clearwater International, LLC, 4420 S. Flores Road, Elmendorf, Tex. 78112, with mixing. To this solution was added 33.3 wt. % of F6 with mixing. The mixture was blended in the reactor for about ½ hours.

Example 8

This example illustrates the preparation of a preferred multi purpose foaming composition of this invention using the foaming agent of Example 1 and a sulfur scavenger, referred to herein as FC6 [F1/IC4/SS1/DI (26.7/6.7/13.3/53.3)].

To a stirred reactor was charged 53.5 wt. % of DI (deionized water), followed by 6.7 wt. % of corrosive inhibitor IC4, then 13.3 wt. % of SS1 (WEC 9802), a triazine sulfur scavenger available from Clearwater International, LLC, 4420 S. Flores Road, Elmendorf, Tex. 78112, with mixing. To this solution was added 26.7 wt. % of F1 of example 1 with mixing. The mixture was blended in the reactor for about ½ hours.

Example 9

This example illustrates the preparation of a preferred multi purpose foaming composition of this invention using the foaming agent of Example 1, a sulfur scavenger and a corrosion inhibitor, referred to herein as FC7 [F1/IC-C/SS1/DI (40/20/40)].

To a stirred reactor was charged 40 wt. % of SSI (WEC 9802), a triazine sulfur scavenger available from Clearwater International, LLC, 4420 S. Flores Road, Elmendorf, Tex. 78112, and 20 wt. % of a corrosion inhibitor IC-C, available from Clearwater International, LLC, 4420 S. Flores Road, Elmendorf, Tex. 78112, with mixing. To this solution was added 40 wt. % of F1 of example 1 with mixing. The mixture was blended in the reactor for about ½ hours.

Example 10

This example illustrates the preparation of a preferred multi purpose foaming composition of this invention using the foaming agent of Example 1, a sulfur scavenger and a corrosion inhibitor, referred to herein as FC8 [F1/IC1/SS1/DI (10/5/10/75)].

To a stirred reactor was charged 75 wt. % of DI (deionized water), followed by 10 wt. % of SS1 (WEC 9802), a triazine sulfur scavenger available from Clearwater International, LLC, 4420 S. Flores Road, Elmendorf, Tex. 78112, and 5 wt. % of a corrosion inhibitor IC1, available from Clearwater International, LLC, 4420 S. Flores Road, Elmendorf, Tex. 78112, with mixing. To this solution was added 10 wt. % of F1 of example 1 with mixing. The mixture was blended in the reactor for about ½ hours.

Example 11

This example illustrates the preparation of a preferred multi purpose foaming composition of this invention using the foaming agent of Example 1, a sulfur scavenger and a corrosion inhibitor, referred to herein as FC9 [F1/IC2/SS1/DI (10/5/10/75)].

To a stirred reactor was charged 75 wt. % of DI (deionized water), followed by 10 wt. % of SS1 (WEC 9802), a triazine sulfur scavenger available from Clearwater International, LLC, 4420 S. Flores Road, Elmendorf, Tex. 78112, and 5 wt. % of a corrosion inhibitor IC2, available from Clearwater International, LLC, 4420 S. Flores Road, Elmendorf, Tex. 78112, with mixing. To this solution was added 10 wt. % of F1 of example 1 with mixing. The mixture was blended in the reactor for about ½ hours.

Example 12

This example illustrates the preparation of a preferred multi purpose foaming composition of this invention using the foaming agent of Example 1 and a sulfur scavenger, referred to herein as FC10 [F1/SSCI1 (60/40)].

To a stirred reactor was charged 40 wt. % of SSCI1, containing a triazine sulfur scavenger available from Clearwater International, LLC, 4420 S. Flores Road, Elmendorf, Tex. 78112, with mixing. To this solution was added 60 wt. % of F1 with mixing. The mixture was blended in the reactor for about ½ hours.

Example 13

This example illustrates the preparation of a preferred multi purpose foaming composition of this invention using the foaming agent of Example 1 and a sulfur scavenger, referred to herein as FC11 [F1/SS1 (85/15)].

To a stirred reactor was charged 15 wt. % of SS1 (WEC 9802), a triazine sulfur scavenger available from Clearwater International, LLC, 4420 S. Flores Road, Elmendorf, Tex. 78112, with mixing. To this solution was added 85 wt. % of F1 with mixing. The mixture was blended in the reactor for about ½ hours.

Example 14

This example illustrates the preparation of a preferred multi purpose foaming composition of this invention using the foaming agent of Example 1 and Mono Ethanol Amine (MEA), referred to herein as FC12 [F1/MEA (95/5)].

To a stirred reactor was charged 5 wt. % of Mono Ethanol Amine (MEA), with mixing. To this solution was added 95 wt. % of F1 with mixing. The mixture was blended in the reactor for about ½ hours.

Example 15

This example illustrates the preparation of a preferred multi purpose foaming composition of this invention using the foaming agent of Example 1, Mono Ethanol Amine (MEA) and a sulfur scavenger, referred to herein as FC13 [F1/SS1/MEA (85/15/5)].

To a stirred reactor was charged 5 wt. % of Mono Ethanol Amine (MEA), followed by 15 wt. % of SS1 (WEC 9802), a triazine sulfur scavenger available from Clearwater International, LLC, 4420 S. Flores Road, Elmendorf, Tex. 78112, with mixing. To this solution was added 85 wt. % of F1 with mixing. The mixture was blended in the reactor for about ½ hours.

Example 16

This example illustrates the preparation of a preferred modified foaming composition using the foaming agent of Example 1 and an oil foam booster, Witconate 3203.

To a stirred reactor was charged 10 wt. % of Witconate 3203, available from Akso Chemie, with mixing. To this solution was added 90 wt. % of F1 with mixing. The mixture was blended in the reactor for about ½ hours.

Example 17

This example illustrates the preparation of a preferred multi purpose foaming composition of this invention using the foaming agent of Example 1 and a sulfur scavenger, referred to herein as FC14 [F1/SS3/W (33/33/33)].

To a stirred reactor was charged 33.3 wt. % of methanol or ethylene glycol, followed by 33.3 wt. % of SS3 (WEC 9807), a triazine sulfur scavenger available from Clearwater International, LLC, 4420 S. Flores Road, Elmendorf, Tex. 78112, with mixing. To this solution was added 33.3 wt. % of F1 with mixing. The mixture was blended in the reactor for about ½ hours.

Example 18

This example illustrates the preparation of a preferred multi purpose foaming composition of this invention using the foaming agent of Example 1 and a sulfur scavenger, referred to herein as FC15 [F6/SS3/W (16.9/83.1/20)].

To a stirred reactor was charged 20 wt. % of methanol or ethylene glycol, followed by 16.9 wt. % of SS3 (WEC 9807), a triazine sulfur scavenger available from Clearwater International, LLC, 4420 S. Flores Road, Elmendorf, Tex. 78112, with mixing. To this solution was added 83.1 wt. % of F6 with mixing. The mixture was blended in the reactor for about ½ hours.

Example 19

This example illustrates the preparation of a preferred multi purpose foaming composition of this invention using the foaming agent of Example 1 and a sulfur scavenger, referred to herein as FC16 [F1/SS3/W (33/33/33)].

To a stirred reactor was charged 33 wt. % of methanol or ethylene glycol, followed by 33 wt. % of SS3 (WEC 9807), a triazine sulfur scavenger available from Clearwater International, LLC, 4420 S. Flores Road, Elmendorf, Tex. 78112, with mixing. To this solution was added 33 wt. % of F1 with mixing. The mixture was blended in the reactor for about 1 hours.

Example 20

IC-A-Neat

This example illustrates the formulation of a foamer and a corrosion inhibitor.

To a reactor or blender was charged 44 wt. % of a corrosion inhibitor comprising Alkyl pyridine quaternary ammonium chloride(APQ) and 24 wt. % of a carbon dioxide buffer/neutralizing agent comprised of MDEA oligomers with mixing. To this mixtures was added 16 wt. % of a first foaming agent comprised of a 9 mole ethylene oxide—nonyl phenol adduct and 11% wt. % of a second foaming agent comprised of a 15 mole ethylene oxide—tallow amine adduct with mixing. After the mixture becomes uniform, 4 wt. % of a preheated corrosion inhibitor comprised of dimer acid amides of TMD, HMD and DACH was added with mixing slowly to the vortex of the mixture. The resulting mixture was then stirred until homogeneous, then the mixture was titrated with 2% glacial acetic acid, while allowing the temperature to rise to 120° F. and 140° F. or slowly heating the solution to this temperature. The final mixture was then stirred for about one hour. This composition is designated IC-A-neat.

Example 21

IC-7

This example illustrates the formulation of another foamer and a corrosion inhibitor.

To a reactor or blender was added 39 wt. % of water (deionized) and 61 wt. % of IC-A-neat with stirring. The resulting compositions will be referred to herein as IC-7.

Example 22

IC-B

This example illustrates the formulation of a foamer and a corrosion inhibitor.

To a reactor or blender was charged 28 wt. % of a corrosion inhibitor comprised of mono and di amides of CTO and AEP and acidified with 8 wt. % glacial acetic acid with stirring. To this mixture, was added 28 wt. % of a first foamer/dispersant comprised of benzyl quaternary of cocamidopropyl betaine and acidified with 11 wt. % thioglycolic acid with stirring. To this mixture was added 11 wt. % of a second foamer/dispersant comprised of a 15 mole ethylene oxide tallow amine adduct, with stirring. To this solution was added 7 wt. % of an oxygen inhibitor/foamer dispersant comprised of polyphosphoric acid esters of mixed alkylphenol ethoxylates. The mixture was allowed to warm to a temperature of about 120° F. to 140° F. and stirred for about one hour. After rendering the mixture homogeneous, 7 wt. % of isopropanol was added as a diluent and winterizer. This composition is designated IC-B.

Example 23

IC-C

This example illustrates a corrosion inhibitor/foamer.

To a reactor or blender was added 22 wt. % of a corrosion inhibitor comprised of TOFA/DETA imidazoline and 12 wt. % of thioglycolic acid with stirring, and cooling(very exothermic). After cooling add 4 wt %. of a benzyl quaternary ammonium chloride quat of a C14 rich synthetic cocotertiary amine blend with mixing then with good mixing add ethyleneglycolmonobutylether at 60 wt. % or use 50/50 mixture of the EGMBE and ethyleneglycol. Slowly add into the vortex an oil soluble alkoxylated alkylphenol/formaldehyde resin with strong mixing and continue for 1 to 2 hours until homogeneous. Slowly titrate with about 1 to 2% of amine heads till pH of solution is greater than 5.0. The resulting compositions will be referred to herein as IC-C.

Example 24

IC-D

This example illustrates the formulation of a roamer and a corrosion inhibitor.

To a reactor or blender was charged 44 wt. % of a carbon dioxide neutralizer comprised of oligomers of MDEA, 40 wt. % of a corrosion inhibitor comprised of APQ, 8 wt. % of a foaming agent comprised of a 15 mole ethylene oxide—tallow amine adduct, and 3 wt. % of a bis ether quaternary salt of cocamidopropylbetaine, with mixing. The resulting mixture was stirred until the mixture was uniform. 5 wt. % of an oxygen dispersant foamer comprised of PE of PPA and alkylphenol ethoxylates was slowly added to a vortex of the mixture with rapid stirring. Mixing is continued until the resulting formulation was homogeneous. This composition is designated IC-D.

Example 25

IC-E

This example illustrates the formulation of a roamer and a corrosion inhibitor.

To a reactor or blender was charged 12 wt. % of isopropanol and 14 wt. % of methanol as a dilutents and winterizers, with mixing. To this mixture of alcohols was added 39 wt. % of a preheated corrosion inhibitor comprised of DTO amides of AEP. The resulting mixture was stirred until uniform and warmed to a temperature between about 120° F. and 130° F. to ensure uniformity. With continued stirring, the mixture was slowly titrated with 10 wt. % of glacial acetic acid, while the temperature was maintained below 140° F. in a closed reactor configuration. The mixture was stirred until it turned completely transparent. To this transparent mixture was added 15 wt. % of a foaming/dispersing agent comprised of a 60/40 ethoxylated polypropylene glycol adduct available from BASF sold under the trade name Pluronic L-64 with stirring. The resulting mixture was stirred until homogeneous, the stirring rate was reduced and 10 wt. % of a foaming agent comprised of a bis ether quaternary salt of cocamidopropylbetaine was added with mixing. The resulting mixture was stirred until clear. This composition is designated IC-E.

Example 26

IC/SI-A

This example illustrates the formulation of a foamer, a corrosion inhibitor.

To a reactor or blender was charged 65 wt. % of water (deionized) with mixing. To the water was added 9 wt. % of a scale inhibitor comprised of phosphate esters of PPA/TEA, a viscous liquid, with stirring until the scale inhibitor is completely dissolved, while ensuring that the temperature remained below about 105° F. The resulting mixture was titrated with 7 wt. % of a neutralizing agent comprised of oligomers of MDEA, with stirring, while maintaining the temperature at or below 105° F. cooling if needed. To this mixture was charged 12 wt. % a first foaming agent comprised of a 9 mole ethylene oxide—nonyl phenol adduct and 1 wt. % of a second foaming agent comprised of a 15 mole ethylene oxide—tallow amine adduct with mixing. The resulting mixture was stirred until homogeneous. To this mixture was added slowly and incrementally, 6 wt. % of a corrosion inhibitor/foamer, ethoxylated tallow diamine, with stirring until the mixture clarified. This composition is designated IC/SI-A.

Example 27

IC/SI-B

This example illustrates the formulation of a foamer, a corrosion inhibitor.

To a reactor or blender was charged 68 wt. % of water (deionized) with mixing. To the water was added 13 wt. % of a scale inhibitor comprised of phosphate esters of PPA/TEA, a viscous liquid, with stirring until the scale inhibitor is completely dissolved. The resulting mixture was slowly titrated with 1 wt. % of a neutralizing agent comprised of oligomers of MDEA, with stirring until the mixture was clear. The stirring rate was reduced and 18 wt. % of IC-A-neat was added to the mixture with stirring. This composition is designated IC/SI-B.

Example 28

IC/SI-C

This example illustrates the formulation of a foamer, a corrosion inhibitor.

To a reactor or blender was charged 55 wt. % of water (deionized) and 13 wt. % of methanol, a winterizing agent, with mixing. To the water/methanol solution was added 4 wt. % of a scale inhibitor comprised of phosphate esters of PPA/TEA, a viscous liquid, with stirring until the scale inhibitor is completely dissolved. The resulting mixture was slowly titrated with 4 wt. % of a neutralizing agent comprised of bis hydroxyethyl ethylenediamine, with stirring until the mixture was clear. The stirring rate was reduced and 20 wt. % of a corrosion inhibitor/foam stabilizer and coupler, comprised of bis ether quaternary salt of cocamidopropylbetaine and 4 wt. % alcohol ether sulfate, $NH_3$/MEA salt were added to the mixture with stirring. This composition is designated IC/SI-C.

Example 29

IC/SI-D

This example illustrates the formulation of a foamer, a corrosion inhibitor.

To a reactor or blender was charged 50 wt. % of water (deionized) with mixing. To the water was added 16 wt. % of a scale inhibitor comprised of phosphate esters of PPA/TEA, a viscous liquid, with stirring until the scale inhibitor is completely dissolved. The resulting mixture was slowly titrated with 6 wt. % of a neutralizing agent comprised of oligomers of MDEA, with stirring until the mixture was clear, while ensuring that the temperature remained below about 105° F. The stirring rate was reduced and 19 wt. % of IC-D was added to the mixture with stirring, while maintaining the temperature at or below 105° F. cooling if needed. To this mixture was added slowly 9 wt. % of methanol into the vortex of the mixture as it was being stirred. This composition is designated IC/SI-D.

Example 30

SI-A

This example illustrates the formulation of a foamer/scale inhibitor.

To a reactor or blender was charged 65 wt. % of water (deionized) with mixing. To the water was slowly added 16 wt. % of a scale inhibitor comprised of phosphate esters of PPA/TEA, a viscous liquid, with stirring until the scale inhibitor is completely dissolved. The stirring rate was reduced and 8 wt. % of a foaming agent comprised of cocamidopropylbetaine was slowly added to the mixture. After the mixture clarified, 11 wt. % of methanol, a winterizer, was added. This composition is designated SI-A.

Example 31

IC-4

This example is a dilution of IC-B, foamer/corrosion inhibitor.

To a reactor add 50% weight of ICB, slowly with mixing add 25% ethylene glycol and 25% ethyleneglycolmonobutyl ether introduced directly into liquid, to inhibit foaming. This composition is designated IC4.

Example 32

SSCI1 this is an example of corrosion inhibitor, foamer, and hydrogen sulfide scavenger, winterized.

To a reactor deionized water at 32% weight is added. Mixing is started. Slowly add 25% weight of SS1 with mixing. IC-7 is added at 33 weight % and mixed until clear solution. A cocamidopropylbisquat (a Gemini-foam stabilizer and coupler for high temperatures) is added at 2% weight or more as needed to qualify under temperature stability. A winterizing agent, ethylene glycol is added at 10% weight. Mixing is continued for ½ to 1 hour, until solution is homogenous. This composition is designated SSCI1.

Example 33

FC(S)18

This is example of a foamer, corrosion inhibitor, and scale inhibitor especially designed for coal seam gas applications.

To a reactor add 26% weight deionized water. With mixing add 7% weight of a scale inhibitor derived from polyphosphoric acid rxn of alkanolamines, neutralized with sodium hydroxide. Mix until all in solution. Then slowly add 6% weight of IC-A-neat and mix until clear. Slowly with slower mixing introduce F1 into liquid @40% weight(or less or more as needed) and mix until in solution. Follow with wintering agents to achieve a pour point of −40 EC, about 6% weight ethylene glycol and 15% weight of methanol. Mix for ½ till uniform. This composition is designated FC(S)18.

CCT Testing of Base Foamer

Introduction

The tubing test was designed to experimental determine in a laboratory environment the feasibility of injecting certain products using coiled tubing. FC1 was tested in three different dilutions: neat, 1:1 dilution in distilled water and 1:2 dilution in distilled water. Foam tests showed that the productivity of FC1 was not affected by the high pressure and high temperature. The 1:2 dilution had the lowest pressure drop and viscosity. In applications, where a small concentration of foamer is needed, a 1:2 dilution or higher would be preferred. A neat injection would not be preferred due to the larger pressure drop through the tubing caused by the higher viscosity of neat FC1. Furthermore, the neat FC1 produces minimal amounts of solids under certain conditions; however, the solid content is insufficient to cause tubing blockage. And, any solid residues can be flushed with water. All dilution of FC1 do not show solid formation, especially 1:1 or higher dilutions.

When selecting a dilution it is important to know the desired surfactant concentration required in the bottom of the well, the length of tubing required to reach the bottom of the well, and the estimated pressure drop through the tubing. A less dilute solution of FC1 can be used if a higher concentration is desired and a pump is available to overcome the pressure drop. It is important not to use a solution that is too dilute because increasing the flow rate increases the pressure drop and pumping too much water can adversely affect well unloading.

Types of Test

Three types of test were run on the FC1. The first type of test involved circulating the fluid through the system. The fluid is circulated through the heated portion of the tubing and then returned to the inlet holding tank. The fluid is allowed to circulate through the system slowly gaining heat until a maximum temperature of about 170° F. was reached. A sample was collected for analysis. This test was designed to mimic down hole conditions during operation. The fluid was flowing and was tested over a range of temperature, but at low pressure.

The second type of test was high temperature and low pressure. Once fluid was pumped through the heated tubing, the pump was shut off and the flow was stopped. The block valve to the pump was closed and the block valve at the exit was left open. This allows pressure due to heating and gas production, if present, to be vented to atmosphere. The fluid was left in the tubing for an adequate period of time to allow the fluid to reach a maximum temperature of about 212° F. After the desired period of time, a sample was collected for analysis. This test was designed to mimic a disruption in fluid pumping with pressure venting to the atmosphere. This test was performed to determine if solids would form under these conditions and block the tubing.

The third type of test was high temperature and high pressure. The testing fluid was stopped in the heated portion of the tubing. The valves on both sides of the heated portion of the tubing are closed and the pressure was allowed to increase. The pressure was vented occasionally to prevent over pressuring of the system. A relief valve was added to keep the pressure at about 2800 psi. The fluid was allowed to heat under pressure. Once the desired amount of time had elapsed, the valves were opened, the pump was turned on and a sample was collected for analysis. The maximum temperature reached during this type of test was approximately 280° F. This test was designed to mimic a situation where the pump was turned off and the pressure was blocked in.

Laboratory Capillary Coiled Tubing (CCT) Tests to Evaluate Foams

The test include (a) Solids—microwave evaporation to a constant weight. (a) Residue do not discolor or (b) Residue is liquid or paste; (b) Heat Stability Test to assess the composition for separation; (c) pH; (d) Specific gravity; (e) Pressure Drop (during test) for Neat, 1:1 dilution and 1:2 dilution; (f) Viscosity before/after; (h) FTIR before/after; (I) Foam Test before/after; (j) Color, indication of change, compare to FTIR; (k) Grind out, inspect any precipitate; (l) Filter solids, ANY, analysis for composition; (m) Pour Point Test; (n) Coefficient of friction before/after; (o) Define compatibility: $Ca^{++}$ coefficient "$CaCl_2$", Ban coefficient "$BaCl_2$" and Chloride tolerance, all performed on heated and non-heated samples; (p) Ether sulfates—Procedure to find sulfate ion; (q) Surface tension before/after; and (r) Critical Micelle Concentration (CMC) before/after.

Capillary Coiled Tubing (CCT) Certification Protocol

For CCT applications, a product that passes all tests may perform low foam height and ½ life but performs in all 4 solutions. Concentrations may be increased from 0.5 to 1.0 to as high as 3.0% nominal or higher if needed. If typical concentration performs and is thermally stable and effective before and after, use will supercede products with higher foam height and ½ life, which are not thermally stable. The product must meet criteria for ease of handling as pour point and minimal toxicity.

Explanation of Laboratory Test

Microwave Solids 1 gram of sample in 50 mL beaker heated at 15 sec intervals with 500 mL of tap water in a 600 mL beaker to absorb excess energy. Repeat measurements, do not allow water to exceed to hot to hold container (about 135° F. to 150° F.), change container. Repeat until 3 constant weights are obtained. Report % solids by microwave.

Note condition of solids. No charring allowed or burning or turning dark brown to black. Faint change of color to tan or minimal color from initial is OK.

Redissolve: minimal crystal residue. Let beaker stand till cool. Add 10 mL distilled water down side of beaker. Let stand 10 to 20 min, slowly swirl and sample must redissolve with no residue.

Heat Stability

Sample in neat form and in dilute form as used 1:1, 1:2, and 10% in some cases. In DI or RO water containing MeOH/EG/K or Na Formate/KCL—2% typically. In hot water bath static @ 70° C. for 2 hours: readings taken at 30 min/45 min/1 hr/1.5 hr/2.0 hr. No separation can occur, such as oil on top or precipitate on bottom or crystals on side or separation of liquid.

Range SG

Range SG is equal to ±0.03.

Density

Density is equal to ±0.25 #/gal.

Pressure Drop

During flow test for neat 1:1, 1:2 and any dilution used in field.

Viscosity

Viscosity is measured using a viscometer, a standard viscosity test.

FTIR

Fourier Transform IR spectra are run before and after testing. Interpret major peaks—No change is permitted. Associated dehydration and salt interactions can occur and are permitted.

Foam Test

Foam test uses a Lab Hamilton Beach Mixer. The mix procedure is mix on high for 45 sec to 60 sec, note any change at 15 sec. Concentrations tested are 0.5% and 1.0%. The solutions include (1) Tap water; (2) Saturated salt water—Prepare with sea salt (aquarium) concentrated. Purged with CO2 to stabilize. Mix 24 hours with 12 hours purge, decant, and filter; (3) Tap water 90%/iso-octane 10%; and (4) Brine 90%/deodorized Kerosene 10%. The tests were carried out in a 1,000 mL graduates or tested in 500 mL graduates to determine if linear. Report ¼ life then ½ life. For excess of 600 mL foam height, the report height is >600 mL. Establish minimums from Foam Test of untreated verses all samples from flow test, heat test and pressure test.

Color

Instrument DR Lange colorimeter. Gardner scale for light colored solutions before heat test at 70 C and after 45 min at 70 C. Repeat before and after flow test for neat, 1:1 and 1:2 or any field dilution.

Grind Out

Standard API method, type and speed. Room Temperature (RT) Test are needed for neat, 1:1, 1:2 or any dilution used in field. At times of 3.0 min/5.0 min/10 min, no separation or layers allowed.

Freeze Thaw method: Cycle 1 (a) First centrifuge at RT for 10 min.; (b) 2 hours at −21° C.; (c) Centrifuge for 10 min; Cycle 2, repeat 1b and 1c; and Cycle 3, repeat 1b and 1c. No separation or layers allowed during any cycle.

Warm/RT method: Cycle 1: (a) First centrifuge at RT for 10 min; (b) 30 min at 70° C.; and (c) Centrifuge for 10 min; Cycle 2, repeat 1b and 1c; and Cycle 3, repeat 1b and 1c. No separation or layers allowed during any cycle.

Filtration

For Lab and Production Samples, filter through simulated 1 micron filter screen, 1 Mr. Coffee filter. Filtrate—Centrifuge 10 min at 100% chemical. No separation of layers, no oil. BS&W establish as nil, no visible residue. All products are filtered through 1 micron filters before use.

Pour Point Test

Pour point test is typically run at (−) 21° C. (Need −15 to −20° C.), Low temperature freeze capable to −50° C. minimal for "W", winterized formulas.

Coefficient of Friction

Run on lubricity instrument or derive from flow test on neat, 1:1, and 1:2 dilutions.

Ca Tolerance

Add 10 mL of sample to 100 mL of distilled water. Mix at room temp. Slowly add 11.8 lb/gal $CaCl_2$ heavy brine, synthetic, standard oil field for completion fluid, origin Tetra, drop wise to point where cloudiness or opaqueness occurs, record (A). Combine until precipitant forms, record (B). (A)—Cloud point; (B)—Precipitation point.

Ba Tolerance

Repeat above but titrate with $BaCl_2$ solution. (A)—Cloud point (B)—Precipitation point. Above titrations can be monitored by Zeta Potential.

Surface Tension

Standard surface tension measurement.

CMC

Critical Micelle Concentration is determined using standard methods.

Corrosion Test

The corrosion tests were performed at use concentration in 1) tap water and 2) sea water concentrated. Typically use is 2.5% chemical. Test with at least carbon steel 1010, stainless steel 2215 or metal being used in field.

Foam Tests

The foam compositions FC1 through FC-17 were tested using production fluids for several different locations. The results are tabulated in Tables IV-V

TABLE IV

Chapparel Produced Water, Comingleda Foam Test[a]

| Product | Grams | FH (mL) | ¼ L (min:sec) | ½ L (min:sec) | Comments |
|---|---|---|---|---|---|
| FC2 | 1.03 | 225 | 0:46 | 1:32 | |
| FC1 | 1.53 | 200 | 0:36 | 1:06 | |
| FC4 | 1.01 | 190 | missed | 1:10 | |
| FC3 | 1.51 | 185 | 0:33 | 1:06 | |
| Champion VDF-137 | 1.03 | 140 | none | none | breaks too fast |
| FC2 | 2.06 | 570 | 4:28 | 6:39 | |
| FC1 | 3.85 | 650+ | 4:08 | 6:14 | |
| FC4 | 2.10 | 550 | 4:15 | 6:20 | |
| FC3 | 3.08 | 530 | 4:06 | 6:09 | |
| Champion VDF-137 | 2.01 | 185 | 0:38 | 1:08 | |

[a]Produced water/Separator #1 Condensate Filtered (90:10)

TABLE V

Galloway Tucker Unit Water Foam Test[a]

| Product | Grams | FH (mL) | ¼ L (min:sec) | ½ L (min:sec) | Comments |
|---|---|---|---|---|---|
| F1 | 0.50 | 155 | 0:20 | 0:38 | |
| F1 1:1 dilution | 1.05 | 185 | 0:38 | 1:07 | |
| F1 1:2 dilution | 1.65 | 175 | 0:37 | 1:08 | |
| Solution poured back into cup additional foamer added and re-tested | | | | | |
| F1 | 0.52 | 265 | 1:07 | 2:08 | |
| F1 1:1 dilution | 1.08 | 355 | 2:13 | 3:37 | |
| F1 1:2 dilution | 1.56 | 350 | 1:55 | 3:22 | |
| MultiChem DF | 1.02 | 135 | 0:18 | 0:31 | |
| FC2 | 1.19 | 185 | 0:35 | 1:11 | |

[a]Unit Water, oil and water separated with a funnel and mixed 95 water with 5 oil for test

TABLE VI

Apache, Taylor Foam Test[a]

| Product | Grams | FH (mL) | ¼ L (min:sec) | ½ L (min:sec) | Comments |
|---|---|---|---|---|---|
| F1 | 0.57 | ~150 | none | none | |
| F1 | +0.53 | 220 | 0:38 | 1:11 | |
| FC1 | 1.58 | ~150 | none | none | |
| FC1 | +1.51 | 210 | 0:31 | 1:00 | |
| F6 (unshaken) | 1.02 | 470 | 4:01 | 6:32 | |
| F6 | 1.02 | 175 | 0:32 | 0:56 | |
| FC5 | 3.00 | 195 | 0:33 | 1:02 | |
| CWF-418 | 1.02 | 195 | 0:38 | 1:06 | |
| Witconate 3203* | 1.01 | 10 | none | none | |

[a]in 100 mL of Produced Water;
*a product of Akzo Chemie

TABLE VII

Kerr and McGee Beaumont, TX Foam Test

| Product | Grams | FH (mL) | ¼ L (min:sec) | ½ L (min:sec) | Comments |
|---|---|---|---|---|---|
| FC1 | 1.54 | 430 | 5:07 | 7:48 | |
| FC6 | 3.22 | 445 | 5:41 | 9:10 | |
| FC7 | 3.25 | 465 | 5:49 | 9:15 | |
| FC8 | 3.22 | 520 | 5:45 | 8:48 | stiff foam |
| FC9 | 3.24 | 475 | 5:45 | 8:40 | stiff foam |

TABLE VIII

Chapparel Produced Water Foam Test[a]

| Product | Grams | FH | ¼ L | ½ L | Comments |
|---|---|---|---|---|---|
| FC 11 Diluted 1:2 | | | | | |
| CPR 01-68 | | | | | |
| Tap water | 2.02 | 650+ | 6:21 | 9:09 | |
| Tap water + 1 mL Condensate | 2.04 | 650+ | 5:03 | 7:42 | cloudy |
| Sep. #4 water | 2.04 | 460 | 4:48 | 7:46 | sample is foamy |
| Sep. #6 water | 2.03 | 650+ | 5:20 | 7:44 | |
| Sep. #6 water/Condensate (90/10) | 2.09 | 190 | 0:45 | 1:21 | |
| FC11 Diluted 1:2 | | | | | |
| CPR 01-68 | | | | | |
| Tap water | 2.01 | 650+ | 5:24 | 8:01 | |
| Neat in Tap water + 1 mL Condensate | 1.00 | 650+ | 5:30 | 8:10 | cloudy |
| Sep. #4 water | 2.02 | 465 | 5:08 | 7:52 | |
| Sep. #6 water | 2.08 | 650+ | 4:42 | 6:48 | |
| Sep. #6 water/Condensate (90/10) | 2.04 | 180 | 0:40 | 1:18 | |
| Champion VDF-137 | | | | | |
| Foamer Chapperal | | | | | |
| Tap water | 2.01 | 650+ | 4:49 | 6:56 | |
| Tap water + 1 mL Condensate | 2.10 | 650+ | 4:16 | 6:20 | slightly cloudy |
| Sep. #4 water | 2.10 | 410 | 4:16 | 7:03 | |
| Sep. #6 water | 2.10 | 650+ | 4:56 | 7:33 | |
| Sep. #6 water/Condensate (90/10) | 2.13 | 345 | 4:10 | 6:23 | |
| FC12 | | | | | |
| CPR 01-73 | | | | | |
| Tap water | 1.05 | 650+ | 5:41 | 8:40 | |
| Tap water + 1 mL Condensate | 1.03 | 650+ | 5:57 | 8:56 | |
| Tap water + 1 mL Condensate | 0.52 | 650+ | 5:10 | 7:32 | |
| FC13 | | | | | |
| CPR 01-73 | | | | | |
| Tap water | 2.01 | 650+ | 5:46 | 8:04 | |
| Tap water + 1 mL Condensate | 2.00 | 650+ | 5:05 | 7:32 | |
| Sep. #6 water + 1 mL Condensate | 2.01 | 360 | 2:23 | 4:22 | low ½ L |
| FC14 | | | | | |
| CPR 01-73 | | | | | |
| Sep. #6 water + 1 mL Condensate | 1.09 | 300 | 1:42 | 3:04 | low ½ L |

TABLE IX

First Dominion Foam Test

| Product | Grams | FH | ¼ L | ½ L | Comments |
|---|---|---|---|---|---|
| \multicolumn{6}{c}{35% Condensate, 65% Produced Water - 500 mL Cylinder} |
| F5/SS1 | 1.51 (1.54) | 600 | 8:50 | 13:09 | |
| F2/SS1 | 1.50 (1.53) | 550 | 7:48 | 11:06 | 20/18:00[a] |
| FC15 | 3.03 | 490 | 8:02 | 11:54 | |
| F1 | 1.52 | 540 | 8:15 | 11:57 | |
| \multicolumn{6}{c}{35 mL Condensate, 65 mL Produced Water - 1000 mL Cylinder} |
| F1 | 3.06 | 570 | | 11:18 | 150/17:00[a] |
| F5 | 3.02 | 570 | | 12:15 | 490/17:30[a] |
| F2 | 3.03 | 550 | | 10:46 | 270/15:30[a] |
| FC15 | 3.07 | 450 | | 10:02 | 10/15:30[a] |
| FC16 | 3.03 | 500 | | 9:24 | 30/15:00[a] |
| FC17 | 3.06 | 470 | | 9:26 | 20/15:00[a] |
| \multicolumn{6}{c}{100 mL Produced Water - 1000 mL Cylinder} |
| F1 | 3.03 | 710 | | 5:56 | |
| CWF-418 | 3.06 | 750 | | 5:27 | |
| F2 | 3.02 | 700 | | 5:43 | |
| FC15 | 4.02 | 680 | | 6:13 | |
| FC16 | 3.04 | 740 | | 5:15 | |
| FC17 | 4.09 | 740 | | 6:21 | |
| F5 | 2.02 | 730 | | 6:50 | |
| \multicolumn{6}{c}{100 mL Produced Water - 1000 mL Cylinder} |
| F1 | 2.01 | 690 | | 6:04 | 2:30[b] |
| CWF-418 | 2.06 | 710 | | 5:42 | 2:30[b] |
| CWF TransFoam O | 2.05 | 650 | | 5:57 | 2:22[b] |
| F2 | 2.02 | 650 | | 5:56 | 2:22[b] |
| F4 | 2.09 | 630 | | 5:10 | 2:00[b] |
| FC15 | 3.08 | 700 | | 6:14 | 2:15[b] |
| \multicolumn{6}{c}{100 mL Produced Water - 1000 mL Cylinder} |
| F1 | 1.02 | 660 | | 6:10 | 2:30[b] |
| CWF-418 | 1.02 | 690 | | 5:52 | 2:30[b] |
| CWF TransFoam O | 1.10 | 590 | | 5:40 | 2:00[b] |
| OFB | 1.01 | 460 | | 4:20 | 2:00[b] |
| F2 | 1.14 | 650 | | 6:10 | 2:30[b] |
| F4 | 1.15 | 680 | | 5:16 | 2:15[b] |
| \multicolumn{6}{c}{40 mL Produced Water, 60 mL Condensate - 500 mL Cylinder} |
| F1 | 3.98 | 410 | 76:00 | | 375/80:00[a] |
| OFB | 2.03 | 50 | 23:46 | 30:03 | 95/81:00[a] |
| CWF-418 | 3.06 | 450 | 31:57 | 45:46 | 140/72:00[a] |
| CWF TransFoam O | 3.14 | 480 | 26:68 | 37:20 | 160/77:00[a] |
| F1/FSH* | 3.17 | 10 | none | | |
| CWF Cat-Foam | 3.08 | 10 | none | | |
| F2 | 3.04 | 490 | 35:46 | 49:16 | |
| F4 | 3.08 | 440 | 34:31 | 47:08 | |

Produced water SG = 1.008;
Condensate SG = 0.807;
FSH—Foam Stabilizer Hydrotrope,
FSH*—Different Foam Stabilizer Hydrotrope;
OFB—Oil Foam Booster,
9807 - $H_2S$ scavenger,
FWF—Fresh Water Foamer,
NE—non-emulsifier;
[a]FH/time (mL/min:sec);
[b]starting to break time

TABLE X

Second Dominion Foam Test

| Product | Grams | FH | ¼ L | ½ L | Comments |
|---|---|---|---|---|---|
| \multicolumn{6}{c}{Produced Water - 1000 mL Cylinder} |
| F1 | 2.02 | 750 | | 5:58 | 730/16:00/92[a] |
| CWF-T360 | 2.01 | 750 | | 6:08 | 730/16:00/93[a] |
| FC10 | 2.06 | 710 | | 5:54 | 410/16:00/96[a] |
| \multicolumn{6}{c}{35 mL Condensate, 65 mL Produced Water - 500 mL Cylinder} |
| F1 | 3.05 | 475 | 10:38 | 14:40 | 320/20:00/85[a] |
| CWF-T360 | 3.10 | 510 | 11:22 | 15:26 | 310/20:00/80[a] |
| FC10+ | 3.05 | 490 | 8:38 | 12:02 | 280/20:00/90[a] |

Produced water SG = 1.008;
Condensate SG = 0.807;
[a]FH/time/water (mL/min:sec/mL)

Corrosion Tests

The following example illustrate the use of various compositions of this invention in corrosion tests.

Corrosion Test 1

FC6 and FC10 were used in combination with an oxygen corrosion inhibitor Weatherford CorrFoam 1 at 0.17% at Apache Taylor. The test involved 1.17 vol. % of the FC6 or FC10 in a 2.5 weight % NaCl brine solution in the present of $CO_2$ and heating.

Sample Preparation

Sample #1

6.8 vol. % of FC6 was mixed with 82.2.2 vol. % of deionized (DI) water and 10% methanol making a total volume of 172.4 mL. The solution was then diluted to a total volume 1,000 mL and contains 2.5 wt. % of NaCl.

Sample #2

6.8 vol. % of FC10, 82.2 vol. % of DI water and 10% volume methanol were mixed in the order listed making a total volume of 172.4 mL. The solution was then diluted to a total volume of 1,000 mL with a brine solution containing 2.5 wt. % of NaCl.

The results of the test are tabulated in TABLE XI.

TABLE XI

Corrosion Test Data for FC6 and FC10

| Time Total hours | Corrosion Rate mpy Sample #1 | Imbalance Sample #1 | Corrosion Rate mpy Sample #2 | Imbalance Sample #2 | Comments |
|---|---|---|---|---|---|
| 0.00 | na | na | na | na | #1 clear yellow tint #2 clear amber |
| 0.17 | 0.57 | 0.2 | 1.01 | 0.5 | T1 = 84, T2 = 84, heat on 4 |
| 0.33 | 1.83 | 0.3 | 3.55 | 1.0 | 84, 84 |
| 0.40 | 7.82 | 11.3 | 3.55 | 1.0 | 89, 89 #1 slightly cloudy |
| 0.58 | 47.74 | 64.9 | 12.89 | 8.6 | 100, 98 |
| 0.75 | 42.74 | 17.7 | 26.97 | 63.4 | 109, 108 |
| 0.95 | 51.53 | 1.6 | 42.58 | 37.3 | 119, 117 |
| 1.10 | 64.94 | 6.5 | 48.27 | 26.7 | 124, 121 |
| 1.40 | 71.07 | 12.1 | 70.76 | 30.2 | 131, 129 |
| 1.58 | 64.19 | 16.3 | 77.53 | 8.0 | |
| 1.62 | 69.06 | 12.1 | 77.53 | 8.0 | |
| 1.70 | 69.86 | 12.1 | 69.84 | 13.0 | |
| 1.75 | 69.06 | 12.1 | 69.84 | 13.0 | * CO2 Started |
| 1.87 | 55.91 | 2.1 | 29.40 | 16.7 | 142, 139 |
| 2.03 | 25.30 | 0.1 | 67.40 | 4.3 | 143, 141 |
| 2.17 | 20.31 | 3.4 | 92.84 | 13.5 | 146, 143 |
| 2.33 | 10.89 | 8.9 | 99.83 | 13.6 | 149, 148 |
| 2.50 | 4.20 | 0.3 | 103.53 | 10.7 | 152, 154 |
| 2.68 | 3.95 | 0.3 | 96.76 | 14.7 | 154, 158 |

TABLE XI-continued

Corrosion Test Data for FC6 and FC10

| Time Total hours | Corrosion Rate mpy Sample #1 | Imbalance Sample #1 | Corrosion Rate mpy Sample #2 | Imbalance Sample #2 | Comments |
|---|---|---|---|---|---|
| 2.87 | 3.99 | 0.4 | 86.14 | 12.5 | 156, 160 |
| 3.03 | 4.01 | 0.4 | 92.34 | 13.4 | |
| 3.22 | 4.08 | 0.3 | 89.90 | 12.1 | 157, 158 |
| 3.38 | 3.92 | 0.4 | 88.03 | 9.4 | 158, 158 |
| 3.55 | 3.79 | 0.5 | 91.76 | 21.7 | 158, 157 |
| 3.73 | 3.73 | 0.4 | 85.61 | 17.1 | |
| 3.90 | 3.70 | 0.4 | 90.84 | 15.9 | 159, 156 |
| 4.07 | 3.57 | 0.5 | 88.04 | 13.2 | |
| 4.23 | 3.53 | 0.5 | 85.06 | 13.0 | 160, 157 |
| 4.40 | 3.47 | 0.6 | 87.85 | 11.8 | 162, 158 |
| 4.58 | 3.46 | 0.5 | 70.35 | 9.5 | 161, 157 |
| 4.87 | 3.21 | 0.5 | 76.22 | 13.9 | |
| 5.08 | 3.19 | 0.4 | 73.52 | 9.0 | |
| 5.33 | 2.97 | 0.4 | 74.12 | 16.5 | |
| 5.87 | 2.94 | 0.4 | 67.22 | 10.6 | 162, 156 |
| 6.00 | 2.95 | 0.5 | 68.99 | 13.2 | Shutdown |

*$CO_2$ started prematurely, the solutions need 4 hours to get to temperature, and they were only allowed 1 hour

Corrosion Test 2

A winterized version of a sulfur scavenger (SS1) and a corrosion inhibitor (IC-7) winterized with methanol and a non-winterized version SSCI1 was tested in a brine solution. 1.17 vol. % of the winterized and non-winterized versions were used in 2.5 wt. % NaCl brine in the presence of $CO_2$ and heating.

Sample Preparation

Solution #1

6.8 vol. % of the non-winterized version of the sulfur scavenger and corrosion inhibitor, 86.3 vol. % of DI water and 9.6 vol. % of Methanol were mixed in the order listed. The total volume was 172.4 mL. The solution was cloudy when the water was mixed last, so the water had to be mixed with the non-winterized version before the methanol was added. The solution was then diluted to a total volume of 1,000 mL with a 2.5 wt. % NaCl brine solution.

Solution #2

6.8 vol. % of non-winterized version SSCI1 was mixed with 93.2% vol DI water, total volume 172.4 mL. The solution was then diluted to a total volume 1,000 mL with a 2.5 wt. % NaCl brine solution.

The results of the test are tabulated in TABLE XII.

TABLE XII

Corrosion Test Data for Non-Winterized and Winterized Versions of a Sulfur Scavenger and a Corrosion Inhibitor

| Time Total hours | Corrosion Rate mpy Solution #1 | Imbalance Solution #1 | Corrosion Rate mpy Solution #2 | Imbalance Solution #2 | Comments |
|---|---|---|---|---|---|
| 0.00 | na | na | na | na | #1 amber, slight haze #2 amber |
| 0.22 | 50.44 | 16.2 | 12.14 | 3.1 | $CO_2$ started 4:25 |
| 0.47 | 27.67 | 2.8 | 44.77 | 9.2 | $CO_2$ turned off after 28 min |
| 1.00 | 10.26 | 0.0 | 31.90 | 3.8 | |
| 14.50 | 18.63 | 2.0 | 54.69 | 2.7 | #1 clear #2 cloudy |
| 15.28 | 33.87 | 1.6 | 87.53 | 0.5 | 7:10, Heat turned on |
| 15.67 | 51.16 | 1.5 | 81.63 | 1.6 | |
| 15.92 | 64.15 | 2.1 | 85.71 | 0.7 | T1 = 128, T2 = 130 |
| 16.17 | 66.99 | 1.9 | 76.66 | 1.6 | 138, 133, #1 cloudy #2 darker |
| 16.42 | 68.00 | 2.7 | 70.48 | 1.3 | both sol about same #2 slightly cloudier |
| 16.58 | 64.65 | 2.6 | 72.97 | 1.6 | 150, 143 |
| 16.75 | 62.18 | 3.4 | 63.59 | 3.0 | 151, 145 |
| 16.97 | 55.14 | 1.9 | 58.15 | 2.2 | 154, 148 |
| 17.30 | 46.62 | 1.8 | 41.42 | 1.3 | 158, 153 |
| 17.68 | 37.57 | 0.8 | 29.11 | 0.2 | 160, 155 #1 less cloudy |
| 18.12 | 30.08 | 0.5 | 24.28 | 0.7 | 161, 159 #2 spot spots forming on sides |
| 18.47 | 26.43 | 1.0 | 22.69 | 0.0 | 163, 158 |
| 18.58 | 27.70 | 0.7 | 22.69 | 0.0 | 163, 160, *11:02 $CO_2$ Started |
| 18.70 | 27.70 | 0.7 | 21.92 | 1.0 | 11:02 #2 lots of debris fell off sparger |
| 18.78 | 25.51 | 0.7 | 20.17 | 0.3 | 163, 161 |
| 19.08 | 21.12 | 0.4 | 14.00 | 0.5 | 164, 161 |
| 19.33 | 19.34 | 1.0 | 12.32 | 0.2 | 162, 160 |
| 19.52 | 18.99 | 0.2 | 11.15 | 0.2 | 162, 160 |
| 19.75 | 18.77 | 0.2 | 9.97 | 0.2 | 160, 158 |
| 20.00 | 18.52 | 0.2 | 9.11 | 0.2 | 159, 156 |
| 20.43 | 18.01 | 0.9 | 7.59 | 0.4 | |
| 20.67 | 17.76 | 1.0 | 7.12 | 0.4 | 158, 156 |
| 20.92 | 16.98 | 1.2 | 6.77 | 0.0 | 159, 157 |
| 21.32 | 15.19 | 0.1 | 5.71 | 0.1 | |
| 21.47 | 14.51 | 0.2 | 5.69 | 0.3 | 161, 158 |
| 22.28 | 11.05 | 0.5 | 4.49 | 0.1 | |
| 22.92 | 9.88 | 0.1 | 4.26 | 0.0 | 175, 172 |
| 23.20 | 9.07 | 0.6 | 4.42 | 0.3 | |
| 23.95 | 7.84 | 0.1 | 4.04 | 0.1 | 166, 163 |
| 24.33 | 7.52 | 0.1 | 3.83 | 0.0 | 165, 163 |

TABLE XII-continued

Corrosion Test Data for Non-Winterized and Winterized Versions of a Sulfur Scavenger and a Corrosion Inhibitor

| Time Total hours | Corrosion Rate mpy Solution #1 | Imbalance | Corrosion Rate mpy Solution #2 | Imbalance | Comments |
|---|---|---|---|---|---|
| 24.58 | 7.24 | 0.0 | 3.57 | 0.1 | 164, 161 #1 product coming out of sol |
| 24.83 | 7.46 | 0.4 | 3.59 | 0.1 | 166, 163 |
| 38.33 | 4.98 | 0.1 | 1.77 | 0.0 | 160, 158 |
| 39.00 | 4.88 | 0.1 | 1.82 | 0.0 | |
| 39.83 | 4.78 | 0.1 | 1.00 | 0.1 | 161, 158 |

After stopping the run, the following observation were made:

Solution #1 was dark amber, cloudy and product was coming out of solution, about 20% to 30% of the amount that was coming out of solution #2.

Solution #2 was dark amber, slightly cloudy, and product was also coming out of solution Solution #1 electrodes were covered with oily film, reference probe had a red gummy buildup. After film was removed, fine pitting was observed, nothing dramatic, pitting pretty evenly dispersed with black stains under the product film.

Solution #2 electrodes had a heavy build up on one side, clean on the other side.

After film was removed, the surface was a dull gray, 25% of surface area covered with small elongated pits, areas of fine pitting with dark marks up and down one side.

The corrosion data is plotted in FIGS. 1A & B.

Corrosion Test 3

The following Corrosion Test was performed at Apache Taylor using FC6 and SSCI1 and (winterizer) potassium formate. The testing was performed with a solution comprising 1.17 vol. % of either FC6 or the SSCI1 in a 2.5 wt. % NaCl brine solution in the presence of $CO_2$ and heating.

Sample Preparation

Sample #1

6.8 vol. % of FC6 was mixed with 93.2 vol. % of DI water making a total volume 172.4 mL. The solution was then diluted to a total volume 1,000 mL using a 2.5 wt. % NaCl brine solution.

Sample #2

6.8 vol. % of a sulfur scavenger/corrosion inhibitor combination SSCI1, 73.2 vol. % of DI water and 20 vol. % of a potassium formate solution were mixed in the order listed. The solution volume was 172.4 mL. The solution became cloudy after the addition of the potassium formate. The solution was then diluted to a total volume of 1,000 mL using a 2.5 wt. % NaCl brine solution and the solution cleared.

The results of the test are tabulated in TABLE XIII.

TABLE XIII

Corrosion Test Data for FC6 and SSCI1/Potassium Formate Combination

| Time hr:min | Time Total hours | Corrosion Rate mpy FC6 | Imbalance | Corrosion Rate mpy SSCI1/KF | Imbalance | Comments |
|---|---|---|---|---|---|---|
| 10:50 | 0.00 | na | na | na | na | #1 clear yellow tint #2 clear amber |
| 10:57 | 0.12 | 4.23 | 0.0 | 9.00 | 9.2 | CO2 started 10:50, #1 getting cloudy |
| 11:07 | 0.28 | 9.42 | 22.9 | 14.08 | 11.3 | CO2 turned off after 17 min |
| 11:14 | 0.40 | 13.49 | 1.0 | 14.08 | 11.3 | #1 clear before CO2 shut off |
| 11:22 | 0.53 | 9.81 | 3.7 | 12.69 | 10.8 | |
| 11:30 | 0.67 | 7.59 | 1.8 | 12.04 | 4.4 | |
| 11:35 | 0.75 | 7.59 | 1.8 | 11.68 | 2.6 | |
| 11:45 | 0.92 | 5.03 | 5.0 | 11.15 | 2.3 | |
| 11:55 | 1.08 | 3.33 | 8.0 | 10.85 | 2.3 | |
| 12:05 | 1.25 | 2.66 | 8.9 | 10.69 | 3.4 | |
| 12:15 | 1.42 | 2.17 | 8.3 | 10.74 | 4.7 | Heat on, Temp 1 = 70, Temp 2 = 70 |
| 12:30 | 1.67 | 2.82 | 9.5 | 17.84 | 5.9 | 87, 87 |
| 1:10 | 2.33 | 13.96 | 47.1 | 64.56 | 13.6 | 123, 121 |
| 1:20 | 2.50 | 17.82 | 50.7 | 67.36 | 26.5 | 128, 125 |
| 1:25 | 2.58 | 27.65 | 65.0 | 77.31 | 5.8 | 131, 128 |
| 1:35 | 2.75 | 46.92 | 68.2 | 71.06 | 8.4 | 133, 130, CO2 started* |
| 1:56 | 3.10 | 5.10 | 2.4 | 45.04 | 1.2 | 142, 138 |
| 1:57 | 3.12 | 5.10 | 2.4 | 55.04 | 4.6 | #2 starting to come out of solution |
| 2:07 | 3.28 | 2.95 | 1.0 | 59.29 | 1.6 | 145, 141 |

TABLE XIII-continued

Corrosion Test Data for FC6 and SSCI1/Potassium Formate Combination

| Time hr:min | Time Total hours | Corrosion Rate mpy FC6 | Imbalance FC6 | Corrosion Rate mpy SSCI1/KF | Imbalance SSCI1/KF | Comments |
|---|---|---|---|---|---|---|
| 2:25 | 3.58 | 2.75 | 0.2 | 81.71 | 1.6 | #1 sol increases with temp and CO2 |
| 2:37 | 3.78 | 2.97 | 0.1 | 93.67 | 0.6 | 152, 147 |
| 2:50 | 4.00 | 3.35 | 0.1 | 96.79 | 0.4 | 154, 148 |
| 2:55 | 4.08 | 3.35 | 0.1 | 100.00 | 1.8 | |
| 3:05 | 4.25 | 3.34 | 0.0 | 103.01 | 0.0 | 155, 150 |
| 3:18 | 4.47 | 3.54 | 0.0 | 103.00 | 0.9 | |
| 3:28 | 4.63 | 3.49 | 0.0 | 95.53 | 1.0 | |
| 4:00 | 5.17 | 3.30 | 0.0 | 95.07 | 0.3 | |

Figure 2A:
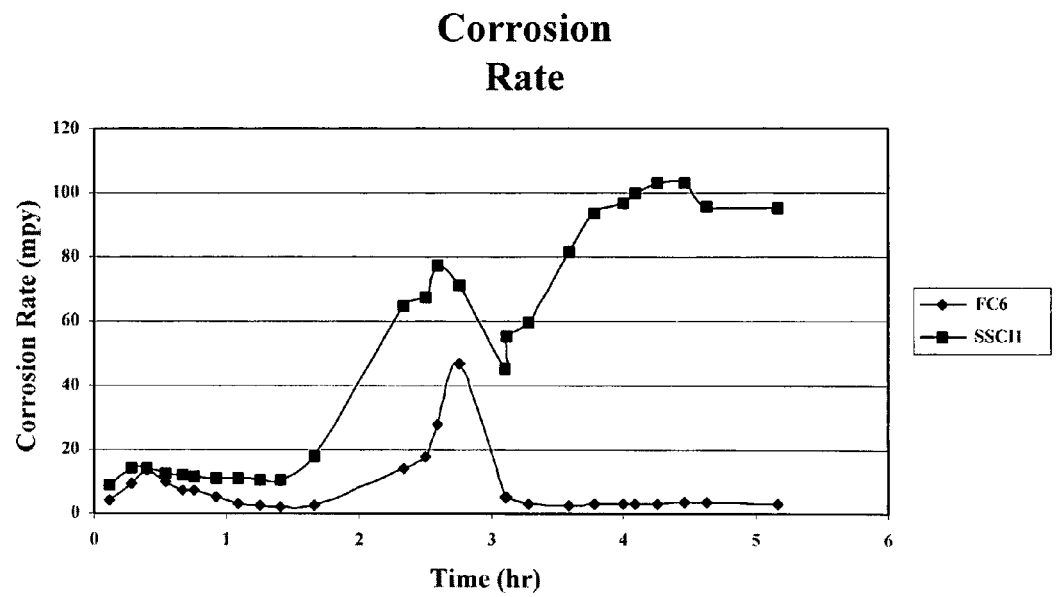
FIGS. 2A & B depicts plots of corrosion test data associated with the Corrosion Test 3.
Figure 2B:
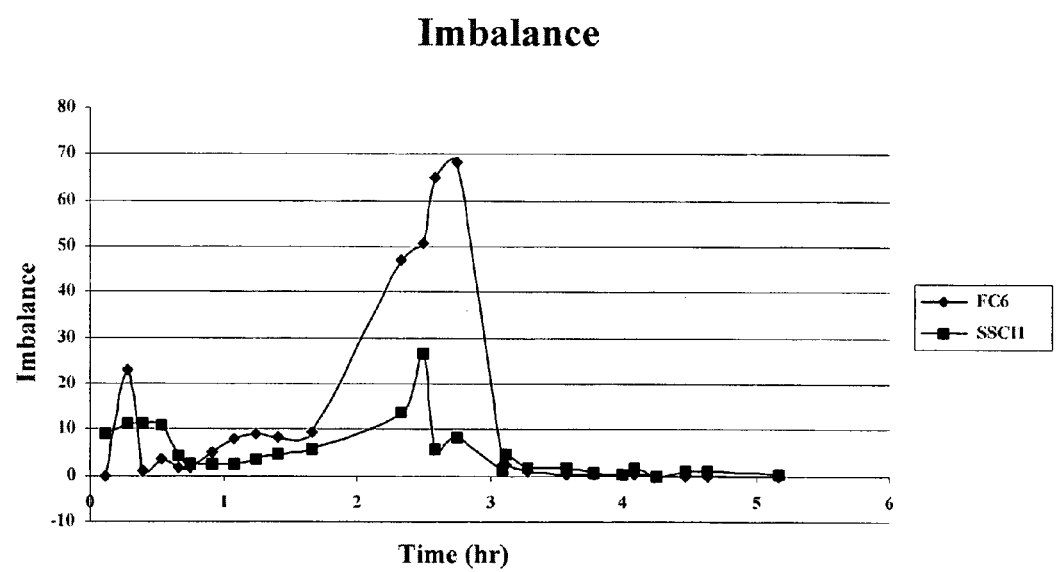

*CO2 started prematurely, the solutions need 4 hours to get to temperature, and they were only allowed 1 hour After stopping the run, the following observation were made:
  Solution #1 electrode was covered with a thin yellow film and appeared to have very small pitting throughout. One area had a few small pits in a row.
  Solution #2 electrode was covered with a thin gold film, had a fair amount of pitting throughout surface. The pits were wide but not very deep. A rust ring around top of probes was observed and under rust large and small pitting was observed.
The corrosion data is plotted in FIGS. 2A & B.

Corrosion Test 4

Foaming/corrosion inhibitor/H2S scavenger Composition FC10 was corrosion tested in with absence and presence of 15 ppm hydrogen sulfide ($H_2S$) in a saturated sea salt brine solution in the presence of a carbon dioxide ($CO_2$) sparge in an LPR flask.
The results of the test are tabulated in TABLE XIV.

TABLE XIV

Corrosion Test Data for FC10 in the Absence and Presence of 15 ppm H2S in Brine** and in the presence of a $CO_2$ sparge

| Time Total hours | Corrosion Rate mpy FC10 - 0 ppm $H_2S$ | Imbalance | Corrosion Rate mpy FC10 - 15 ppm $H_2S$ | Imbalance | Comments |
|---|---|---|---|---|---|
| 0.00 | na | na | na | na | Both sol clear |
| 0.25 | 18.81 | 11.5 | 14.72 | 4.3 | |
| 0.53 | 23.43 | 1.6 | 18.43 | 10.1 | |
| 0.87 | 16.25 | 3.1 | 15.89 | 8.6 | 0.25% FC10 added to both |
| 1.25 | 16.29 | 2.2 | 16.53 | 14.2 | both sol medium-dull amber |
| 1.37 | 15.60 | 0.7 | 14.50 | 5.7 | |
| 1.57 | 14.25 | 4.8 | 12.21 | 2.1 | was open to air, sealed |
| 1.93 | 14.62 | 5.5 | 11.62 | 1.6 | |
| 1.95 | 13.82 | 1.6 | 11.62 | 1.6 | |
| 2.18 | 14.28 | 0.6 | 10.99 | 1.5 | |
| 2.43 | 13.33 | 0.1 | 10.89 | 0.9 | |
| 2.67 | 11.05 | 4.2 | 11.17 | 0.0 | |
| 2.78 | 12.53 | 0.0 | 11.11 | 0.9 | |
| 3.95 | 11.94 | 3.9 | 11.67 | 2.1 | |
| 4.23 | 12.82 | 2.5 | 11.94 | 2.4 | |
| 4.37 | 12.17 | 2.1 | 11.86 | 3.3 | #2 Sulfide added 0.112 grams*** |
| 4.78 | 11.25 | 4.0 | 4.50 | 0.9 | |
| 4.95 | 11.99 | 2.0 | 3.01 | 0.8 | #2 sol tint getting darker |
| 5.20 | 12.26 | 2.3 | 2.17 | 0.9 | |
| 5.48 | 11.38 | 3.7 | 2.09 | 0.8 | |
| 5.77 | 11.73 | 2.2 | 2.12 | 0.2 | |
| 5.93 | 11.12 | 1.6 | 2.17 | 0.2 | |
| 6.17 | 11.77 | 1.6 | 2.41 | 0.7 | |
| 6.23 | 11.49 | 2.2 | 2.41 | 0.7 | |
| 6.30 | 11.49 | 2.2 | 2.49 | 0.7 | |
| 6.47 | 11.83 | 3.1 | 5.45 | 1.9 | *CO2 Started to #2 |
| 6.55 | 9.20 | 3.5 | 5.45 | 1.9 | *CO2 Started to #1 |
| 6.60 | 9.20 | 3.5 | 6.28 | 1.1 | low flow on CO2 due to foaming |
| 6.73 | 7.29 | 1.1 | 6.28 | 1.1 | |
| 6.77 | 7.29 | 1.1 | 4.68 | 0.4 | |
| 7.28 | 3.74 | 0.1 | 3.67 | 0.0 | |
| 7.47 | 3.43 | 0.5 | 3.65 | 0.2 | |
| 7.77 | 2.87 | 0.1 | 3.56 | 0.1 | |
| 7.90 | 2.31 | 0.2 | 3.42 | 0.0 | |
| 8.23 | 1.62 | 0.1 | 3.15 | 0.4 | |
| 8.25 | 1.43 | 0.1 | 3.15 | 0.4 | |
| 21.12 | 0.44 | 0.0 | 0.73 | 0.1 | |
| 22.37 | 0.43 | 0.0 | 0.71 | 0.1 | Both sol almost clear, still colored |
| 23.13 | 0.44 | 0.0 | 0.72 | 0.1 | |
| 23.83 | 0.45 | 0.0 | 0.73 | 0.0 | |
| 25.30 | 0.46 | 0.0 | 0.73 | 0.0 | |

Figure 3A:
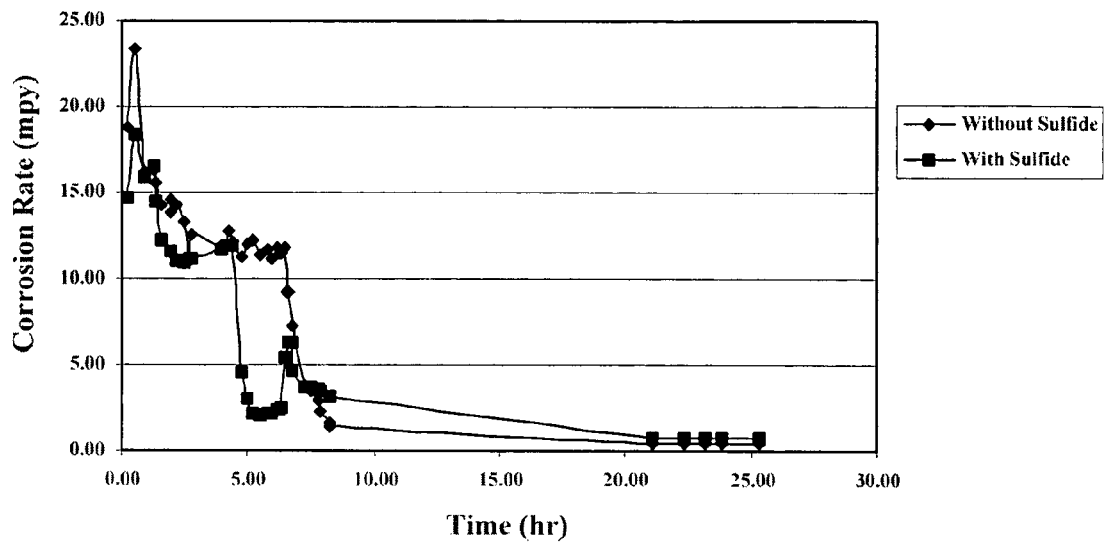
FIGS. 3A & B depicts plots of corrosion test data associated with the Corrosion Test 4.
Figure 3B:
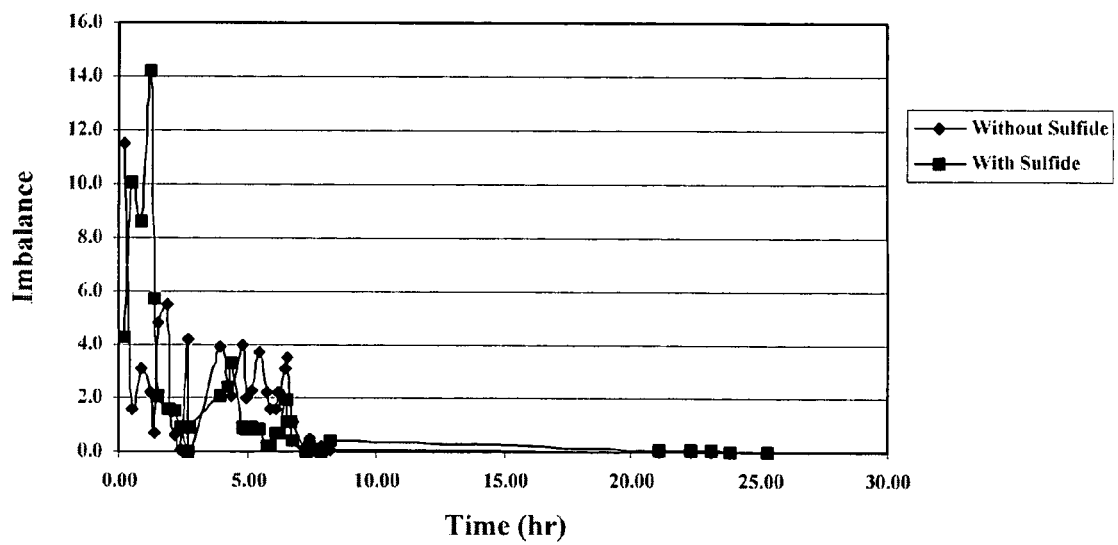

**Brine, Water saturated with sea salt, SG = 1.151;
***Sulfide added as 113 mg/L $Na_2S.9H_2O$ After stopping the run, the following observation were made:
  Solution #1 probe had a few rust specs on tip, but overall looked clean.
  Solution #2 probe were covered in a black film with pitting under film.
The corrosion data is plotted in FIGS. 3A & B.

Corrosion Test 5

Foaming/corrosion inhibitor Composition IC-4 was corrosion tested in a saturated sea salt brine solution in the presence of a carbon dioxide ($CO_2$) sparge with 2 increment additions of 5 μL each or total of 10 mg/L.

The results of the test are tabulated in TABLE XV.

TABLE XV

Corrosion Test Data CI for FC6 in *Brine in the presence of $CO_2$

| Time Total hours | Corrosion Rate mpy | Imbalance | Comments |
|---|---|---|---|
| 0.00 | 34.65 | 0.7 | Sol clear |
| 0.08 | 21.46 | 4.5 | |
| 0.30 | 18.61 | 1.8 | |
| 0.50 | 16.52 | 0.7 | |
| 0.88 | 16.31 | 0.2 | |
| 1.45 | 18.87 | 0.6 | |
| 2.08 | 19.72 | 0.6 | |
| 2.42 | 19.80 | 1.2 | |
| 2.92 | 19.78 | 0.9 | |
| 3.17 | 19.72 | 1.1 | |
| 4.33 | 19.33 | 1.2 | |
| 4.55 | 19.41 | 0.8 | 5 μL of IC-4 |
| 5.00 | 9.48 | 0.2 | |
| 5.15 | 8.26 | 0.1 | |
| 5.32 | 8.26 | 0.1 | |
| 5.33 | 7.41 | 0.2 | |
| 5.55 | 6.81 | 0.3 | |
| 5.68 | 6.43 | 0.6 | |
| 5.73 | 6.43 | 0.6 | |
| 5.82 | 6.09 | 0.0 | |
| 5.97 | 5.74 | 0.5 | |
| 6.20 | 5.53 | 0.5 | |
| 6.25 | 5.19 | 0.7 | |
| 6.33 | 5.19 | 0.7 | |
| 6.47 | 5.03 | 0.4 | |
| 6.62 | 4.86 | 0.7 | |
| 6.73 | 4.67 | 0.6 | |
| 7.50 | 3.78 | 1.0 | |
| 8.33 | 3.37 | 0.7 | |
| 8.67 | 3.16 | 0.6 | |
| 9.00 | 3.02 | 0.4 | |
| 9.12 | 2.91 | 0.3 | |
| 22.00 | 1.66 | 0.0 | |
| 22.50 | 1.60 | 0.0 | |
| 23.00 | 1.57 | 0.0 | |
| 23.50 | 1.59 | 0.0 | Over 90% reduction |
| 23.78 | 1.59 | 0.0 | 5 μL of IC-4 (10 μL total) |
| 23.92 | 1.56 | 0.0 | |
| 24.02 | 1.56 | 0.0 | |
| 24.08 | 1.52 | 0.1 | |
| 24.42 | 1.52 | 0.1 | |
| 24.50 | 1.52 | 0.1 | |
| 24.67 | 1.53 | 0.1 | |
| 24.72 | 1.50 | 0.0 | |
| 24.80 | 1.50 | 0.0 | |
| 25.42 | 1.48 | 0.0 | |
| 25.43 | 1.48 | 0.0 | |
| 25.62 | 1.46 | 0.0 | |
| 25.92 | 1.45 | 0.0 | |
| 25.95 | 1.41 | 0.0 | |
| 26.15 | 1.44 | 0.0 | |
| 27.00 | 1.39 | 0.0 | |
| 27.67 | 1.39 | 0.0 | |
| 27.75 | 1.37 | 0.0 | |
| 28.83 | 1.29 | 0.0 | |
| 29.27 | 1.32 | 0.0 | |
| 29.83 | 1.29 | 0.0 | |
| 29.93 | 1.29 | 0.0 | |
| 30.22 | 1.27 | 0.0 | |
| 30.30 | 1.27 | 0.0 | |
| 30.47 | 1.27 | 0.0 | |
| 30.62 | 1.28 | 0.1 | |
| 30.95 | 1.25 | 0.0 | |
| 31.25 | 1.25 | 0.0 | |

Figure 4A:
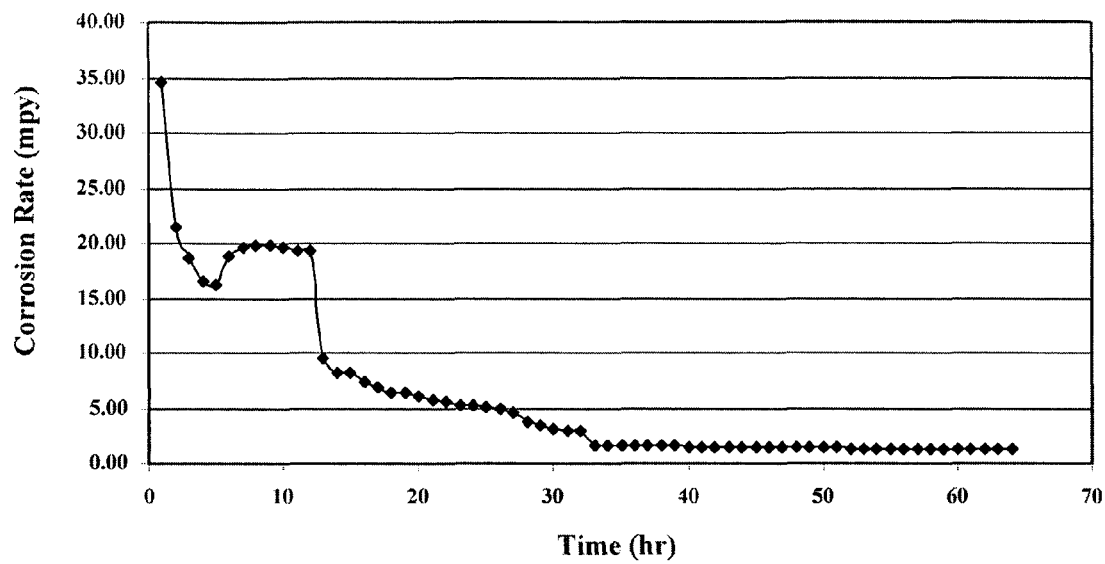
FIGS. 4A & B depicts plots of corrosion test data associated with the Corrosion Test 5.
Figure 4B:
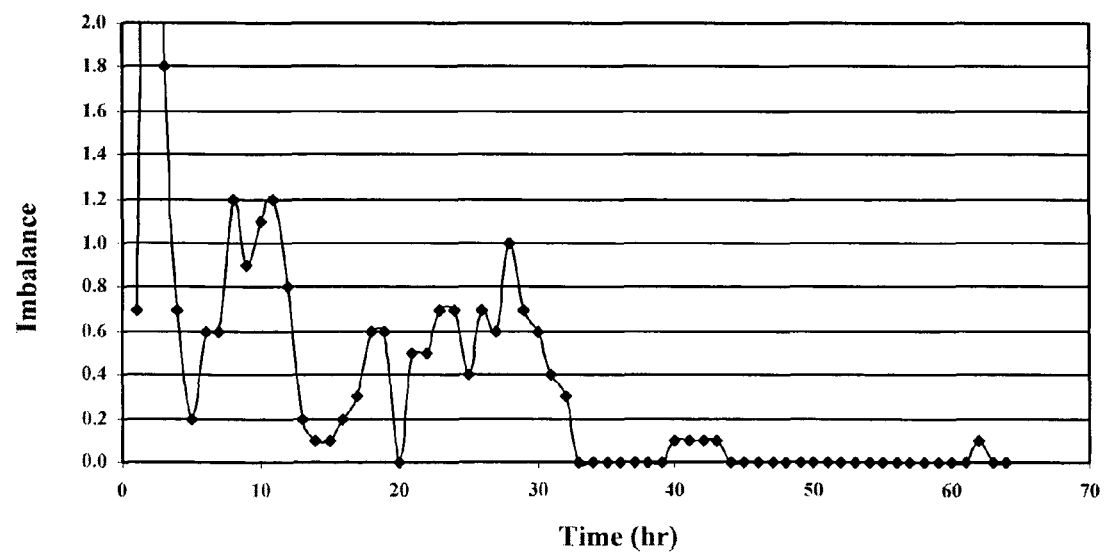

*Brine is water saturated with sea salt SG = 1.143, $CO_2$ is sparged into the brine from the start of the test After shutdown, there was very slight pitting on the upper 50% of probe, which corresponds to the high bubble contact zone. The corrosion data is plotted in FIGS. 4A & B.

Corrosion Test 6

A foamer/sulfur scavenger/corrosion inhibitor combination SSCI1 was corrosion tested in a saturated sea salt brine solution in the presence of a carbon dioxide ($CO_2$) sparge.

The results of the test are tabulated in TABLE XVI.

TABLE XVI

Corrosion Test Data using foamer/sulfur scavenger/corrosion inhibitor combination in *Brine and in the presence of $CO_2$ sparged

| Time Total hours | Corrosion Rate mpy | Imbalance | Comments |
|---|---|---|---|
| 0.00 | na | na | Solution Clear |
| 0.08 | 17.58 | 0.6 | |
| 0.25 | 19.78 | 4.2 | |
| 0.53 | 15.00 | 0.3 | |
| 0.73 | 15.05 | 0.4 | |
| 0.87 | 15.01 | 0.5 | 5 μL of SSCI1 |
| 0.95 | 15.15 | 0.8 | |
| 1.20 | 14.98 | 1.1 | |
| 1.70 | 14.48 | 0.8 | 5 μL of SSCI1 (10 μL) |
| 1.78 | 14.39 | 0.7 | |
| 2.12 | 13.62 | 0.5 | |
| 2.20 | 13.11 | 0.1 | |
| 2.57 | 13.01 | 0.2 | |
| 3.28 | 12.00 | 0.4 | |
| 3.87 | 11.18 | 0.5 | |
| 3.95 | 11.25 | 0.5 | 5 μL of SSCI1 (15 μL) |
| 4.08 | 11.16 | 0.5 | |
| 4.32 | 10.84 | 0.5 | |
| 4.53 | 10.30 | 0.6 | |
| 4.92 | 9.98 | 0.1 | |
| 5.37 | 9.61 | 0.5 | |
| 5.87 | 9.27 | 0.6 | 5 μL of SSCI1 (20 μL) |
| 6.28 | 9.02 | 0.3 | |
| 6.57 | 8.79 | 0.3 | |
| 6.98 | 8.39 | 0.0 | |
| 7.45 | 7.94 | 0.1 | |
| 34.53 | 5.24 | 1.0 | 5 μL of SSCI1 (25 μL) |
| 35.07 | 5.15 | 1.0 | |
| 36.45 | 4.91 | 0.9 | 5 μL of SSCI1 (30 μL) |
| 38.87 | 4.55 | 0.8 | 5 μL of SSCI1 (35 μL) |
| 40.87 | 4.26 | 0.7 | 5 μL of SSCI1 (40 μL) |
| 41.65 | 4.06 | 0.6 | |
| 80.45 | 1.79 | 0.2 | |
| 83.12 | 1.77 | 0.2 | Shutdown |

Figure 5A:
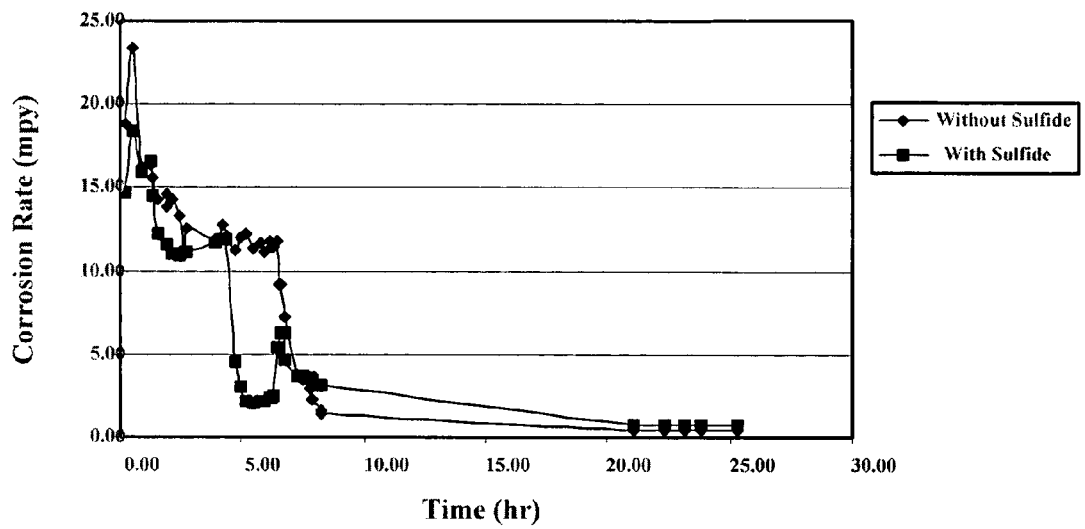
FIGS. 5A & B depicts plots of corrosion test data associated with the Corrosion Test 6.
Figure 5B:
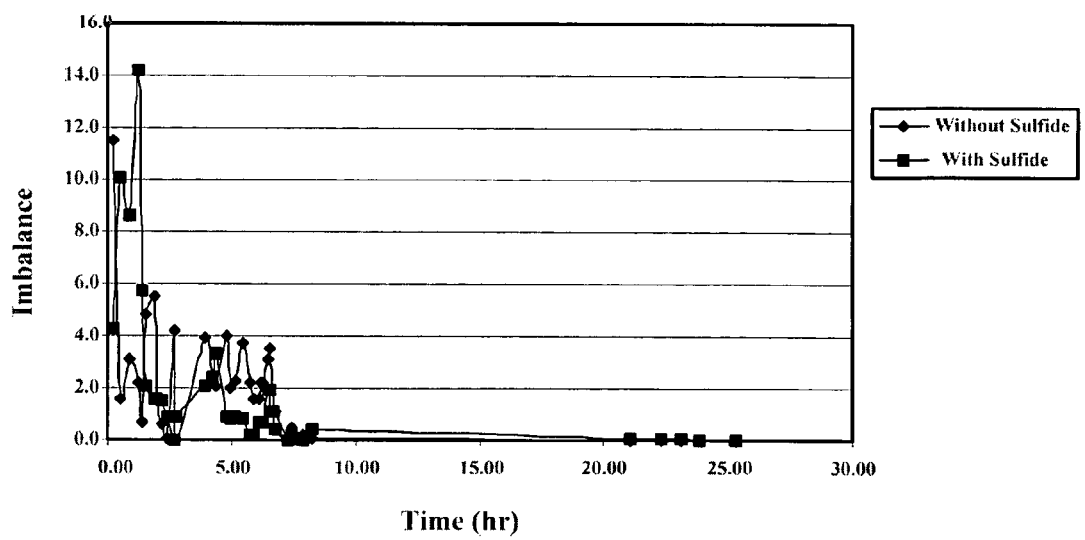

*Brine is water saturated with sea salt SG = 1.143, CO2 is sparged into the brine from the start of the test After shutdown, the probes were very clean, with slight discoloration and trace pitting on the tips. The corrosion data is plotted in FIGS. 5A & B.

Corrosion Test 7

Foamer/corrosion inhibitors IC-7 and IC-C were corrosion tested in a saturated sea salt brine solution in the presence of a carbon dioxide ($CO_2$) sparge.

The results of the test are tabulated in TABLE XVII.

TABLE XVII

Corrosion Test Data Using Sulfur Scavenger/Corrosion Inhibitor Combination In *Brine

| Time Total hours | Corrosion Rate mpy | Imbalance | Corrosion Rate mpy | Imbalance | Comments |
|---|---|---|---|---|---|
| 0.00 | na | na | na | na | Both solutions clear |
| 0.17 | 21.18 | 4.7 | na | na | |
| 0.33 | 17.03 | 2.5 | 19.06 | 1.1 | |
| 0.63 | 16.79 | 2.1 | 18.38 | 0.6 | |

TABLE XVII-continued

Corrosion Test Data Using Sulfur Scavenger/Corrosion Inhibitor Combination In *Brine

| Time Total hours | Corrosion Rate mpy | Imbalance | Corrosion Rate mpy | Imbalance | Comments |
|---|---|---|---|---|---|
| 0.73 | 16.98 | 1.7 | 18.38 | 0.6 | |
| 0.92 | 17.31 | 1.6 | 19.20 | 0.6 | |
| 1.00 | 17.53 | 1.3 | 19.20 | 0.6 | #1 5 µL IC-7, #2 5 µL IC-C |
| 1.30 | 13.18 | 1.7 | 7.52 | 1.3 | |
| 1.58 | 11.37 | 1.3 | 4.67 | 0.1 | |
| 1.80 | 9.00 | 0.6 | 4.01 | 0.2 | |
| 1.97 | 8.33 | 0.6 | 3.48 | 0.2 | |
| 2.05 | 8.33 | 0.6 | 3.08 | 0.2 | |
| 2.17 | 7.71 | 0.3 | 3.08 | 0.2 | |
| 2.32 | 7.22 | 0.2 | 2.41 | 0.1 | |
| 2.77 | 6.10 | 0.1 | 2.01 | 0.0 | |
| 2.92 | 5.85 | 0.0 | 1.87 | 0.1 | |
| 3.28 | 5.31 | 0.1 | 1.61 | 0.0 | |
| 3.53 | 4.80 | 0.1 | 1.44 | 0.0 | |
| 4.12 | 4.50 | 0.1 | 1.17 | 0.0 | |
| 4.62 | 4.02 | 0.0 | 1.06 | 0.1 | |
| 4.78 | 3.85 | 0.1 | 1.00 | 0.1 | |
| 4.88 | 3.85 | 0.1 | 0.99 | 0.0 | |
| 5.68 | 3.69 | 0.0 | 0.90 | 0.0 | |
| 5.92 | 3.53 | 0.1 | 0.84 | 0.0 | |
| 6.17 | 3.47 | 0.1 | 0.84 | 0.0 | |
| 6.50 | 3.43 | 0.1 | 0.82 | 0.0 | |
| 6.75 | 3.38 | 0.0 | 0.79 | 0.0 | |
| 7.07 | 3.37 | 0.0 | 0.77 | 0.0 | |
| 7.12 | 3.27 | 0.1 | 0.77 | 0.0 | |
| 7.50 | 3.23 | 0.1 | 0.76 | 0.0 | |
| 7.85 | 3.13 | 0.1 | 0.73 | 0.0 | |
| 21.50 | 2.39 | 0.0 | 0.67 | 0.0 | |
| 21.90 | 2.36 | 0.0 | 0.67 | 0.0 | |
| 22.67 | 2.31 | 0.0 | 0.64 | 0.0 | #2 Shutdown |
| 22.87 | 2.30 | 0.0 | | | |
| 23.12 | 2.29 | 0.0 | | | #1 5 µL IC-7 |
| 23.27 | 2.21 | 0.0 | | | |
| 23.32 | 2.06 | 0.0 | | | |
| 23.58 | 2.02 | 0.0 | | | |
| 23.83 | 1.84 | 0.1 | | | |
| 23.95 | 1.79 | 0.1 | | | |
| 24.33 | 1.74 | 0.1 | | | |
| 24.95 | 1.59 | 0.1 | | | |
| 25.03 | 1.60 | 0.1 | | | |
| 25.28 | 1.58 | 0.1 | | | |
| 25.58 | 1.56 | 0.1 | | | |
| 25.97 | 1.53 | 0.1 | | | |
| 26.08 | 1.52 | 0.1 | | | |
| 26.33 | 1.52 | 0.1 | | | |
| 26.45 | 1.50 | 0.1 | | | |
| 26.82 | 1.49 | 0.1 | | | |
| 27.08 | 1.47 | 0.1 | | | |
| 27.42 | 1.45 | 0.1 | | | |
| 27.67 | 1.44 | 0.1 | | | |
| 28.27 | 1.40 | 0.0 | | | |
| 28.50 | 1.40 | 0.0 | | | |
| 29.00 | 1.37 | 0.0 | | | |
| 29.42 | 1.34 | 0.0 | | | |
| 29.98 | 1.35 | 0.0 | | | #1 5 µL IC-7 |
| 30.33 | 1.23 | 0.0 | | | |
| 30.95 | 1.14 | 0.0 | | | |
| 31.50 | 1.14 | 0.0 | | | |
| 31.83 | 1.12 | 0.0 | | | |
| 44.12 | 1.09 | 0.0 | | | |
| 45.00 | 0.81 | 0.1 | | | |
| 46.42 | 0.84 | 0.1 | | | |
| 46.75 | 0.84 | 0.1 | | | #1 Shutdown, IC-7 15 µL total |

*Brine is water saturated with sea salt

Figure 6:
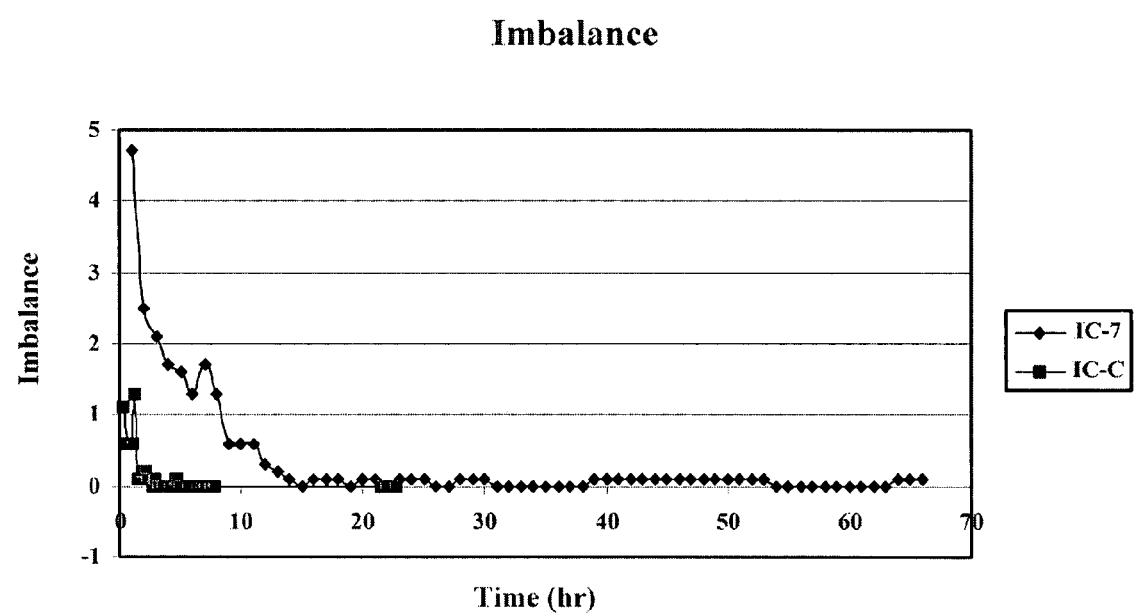
FIG. 6 depicts plots of corrosion test data associated with the Corrosion Test 7.

Shutdown #2 probe is clean, slight discoloration, very little pitting, Shutdown IC-7 electrodes clean, shiny with some small areas of dark discoloration, after cleaning and under magnification surface looks good and no signs of pitting. The corrosion data is plotted in FIG. 6.

Water Test Data

Water Test 1

Water from Corrosion Test 3 was analyzed and the results of the test are tabulated in TABLES XVIIIA&B.

TABLE XVIIIA

Water Analysis Report

Sample Description

1 - gallon water sample with traces of light oil. Sample was filtered to remove hydrocarbon and solids prior to analysis and test evaluations. Solids were noted to be mainly FeO2

Sample Characteristics

| Sample Temperature | 70° F. | Viscosity | 1 cp |
|---|---|---|---|
| Sample pH | 6.50 | Color | Orange color with some solids |
| Sample Specific Gravity | 1.002 | Odor | None |
| Corrected Sample Specific Gravity | 1.004 @ 60° F. | Turbidity | Clear (after filtering) |
| Sample Resistivity (Calc) | 0.65 W-m | Filtrates | Hydrocarbon |

TABLE XVIIIB

Water Analysis Report

| | mg/L | me/L | ppm |
|---|---|---|---|
| Sample Composition | | | |
| CATIONS | | | |
| Sodium (calc.) | 3554 | 154.6 | 3547 |
| Calcium | 88 | 4.4 | 88 |
| Magnesium | 44 | 3.6 | 44 |
| Barium | 1 | 0.0 | 1 |
| Potassium | 18 | 0.5 | 18 |
| Iron | 12.20 | 0.4 | 12.18 |
| ANIONS | | | |
| Chloride | 5600 | 158.0 | 5589 |
| Sulfate | 26 | 0.5 | 26 |
| Hydroxide | 24 | 1.4 | 24 |
| Carbonate | 125 | 4.2 | 125 |
| Bicarbonate | <1 | — | — |
| Summary | | | |
| Total Dissolved Solids (calc.) | 9325 | | 9306 |
| Total Hardness as CaCO$_3$ | 400 | 8.0 | 400 |
| Scaling Tendencies | | | |
| CaCO$_3$ Factor | 0 | Calcium Carbonate Scale Probability -->REMOTE | |
| CaSO$_4$ Factor | 2293.72 | Calcium Sulfate Scale Probability ------>REMOTE | |

Water from Corrosion Test 3 was analyzed and the results of the test are tabulated in TABLES XIXA&B.

TABLE XIXA

Water Analysis Report

Sample Description

1 - gallon water sample with traces of paraffin or asphatene solids. Sample was filtered to remove hydrocarbon and solids prior to analysis and test evaluations.

Sample Characteristics

| | | | |
|---|---|---|---|
| Sample Temp | 70° F. | Viscosity | 1 cp |
| pH | 7.00 | Color | Dark gray color with solids |
| Specific Gravity | 1.001 | Odor | None |
| S.G. (Corrected) | 1.003@ 60° F. | Turbidity | Clear (after filtering) |
| Resistivity (Calc) | 0.26 W-m | Filtrates | Hydrocarbon |

TABLE XIXB

Water Analysis Report

| | mg/L | me/L | ppm |
|---|---|---|---|
| Sample Composition | | | |
| CATIONS | | | |
| Sodium (calc.) | 9385 | 408.2 | 9376 |
| Calcium | 64 | 3.2 | 64 |
| Magnesium | 39 | 3.2 | 39 |
| Barium | 0 | 0.0 | 0 |
| Potassium | 10 | 0.3 | 10 |
| Iron | 5.70 | 0.2 | 5.69 |
| ANIONS | | | |
| Chloride | 14600 | 411.8 | 14585 |
| Sulfate | 22 | 0.5 | 22 |
| Hydroxide | 25 | 1.5 | 25 |
| Carbonate | 87 | 2.9 | 87 |
| Bicarbonate | <1 | — | — |
| Summary | | | |
| Total Dissolved Solids (calc.) | 24116 | | 24092 |
| Total Hardness as CaCO$_3$ | 320 | 6.4 | 320 |
| Scaling Tendencies | | | |
| CaCO$_3$ Factor | 0 | Calcium Carbonate Scale Probability -->REMOTE | |
| CaSO$_4$ Factor | 1411.52 | Calcium Sulfate Scale Probability -->REMOTE | |

Well Production Data

The corrosion testing data presented above shows that the combination of a foaming agent and either a sulfur scavenger, a corrosion inhibitor or both results in a composition that has both improved foaming properties, i.e., the sulfur scavenger and/or corrosion inhibitor improves foam characteristics and properties, while simultaneously, improving sulfur scavenging activity and corrosion inhibitor activity, where the latter is believed to be due to improved mass transfer from sulfur scavenger and/or corrosion inhibitors concentrated in the films of the bubbles that comprise the foam.

Figure 7:
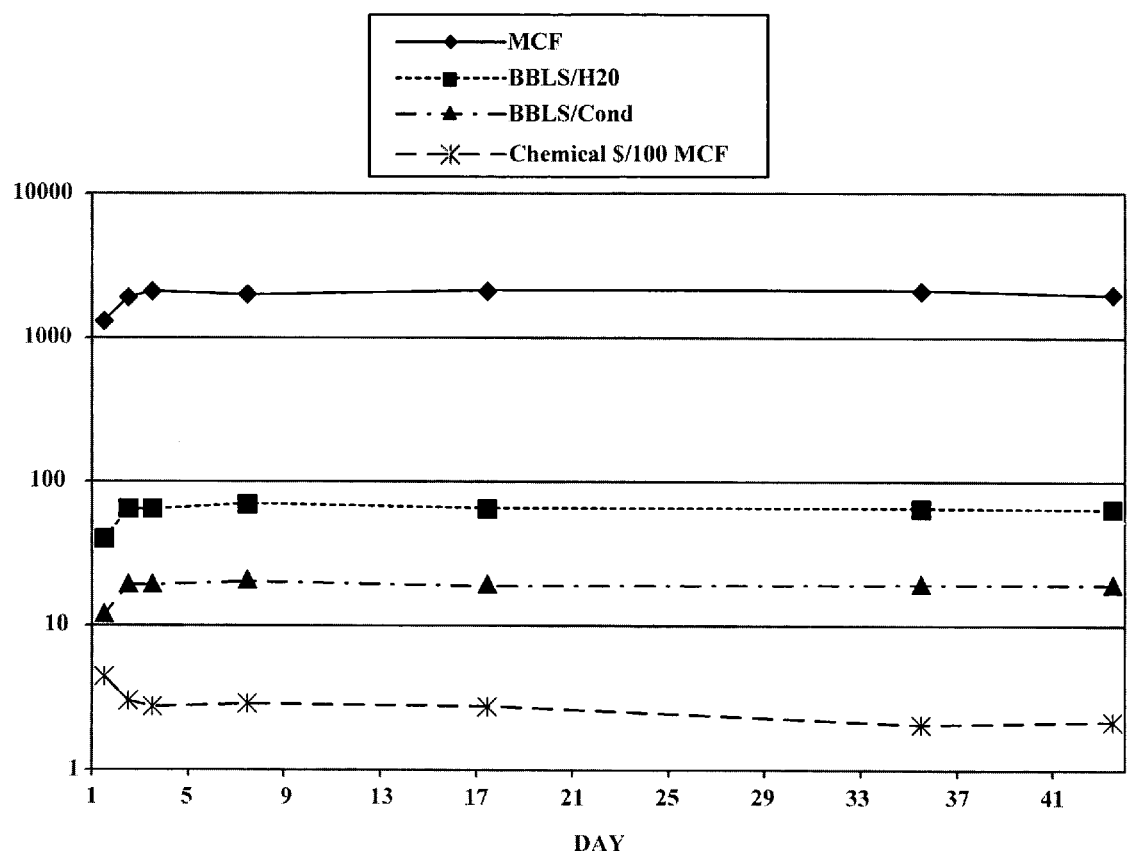
FIG. 7 depicts plot of production data for Corrosion Test 2.

Referring now to FIG. 7, the water production data associated with Corrosion Test 2 is shown clearly evidencing an increase in production and a decrease in cost after initial foam composition injection.

Figure 8:
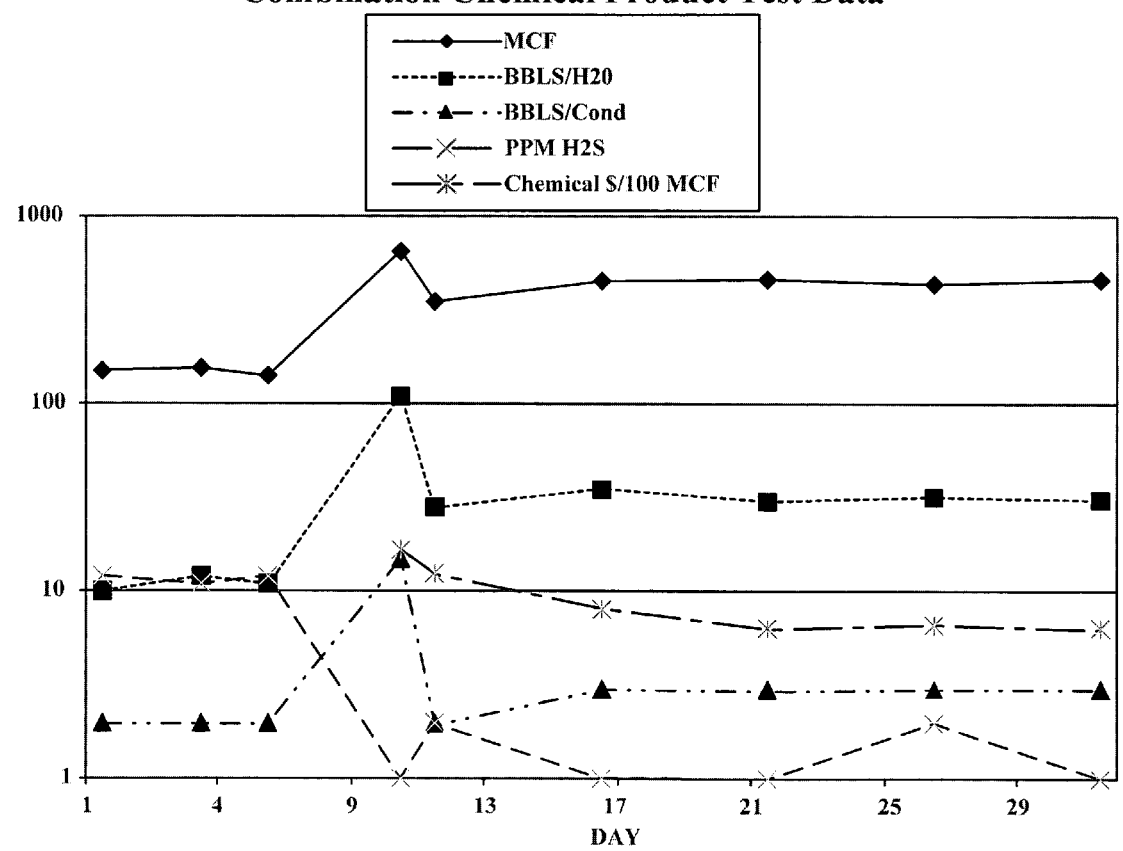
FIG. 8 depicts plot of production data for Corrosion Test 4.

Referring now to FIG. 8, the water production data associated with Corrosion Test 4 is shown clearly evidencing an increase in production and a decrease in cost after initial foam composition injection.

Figure 9:
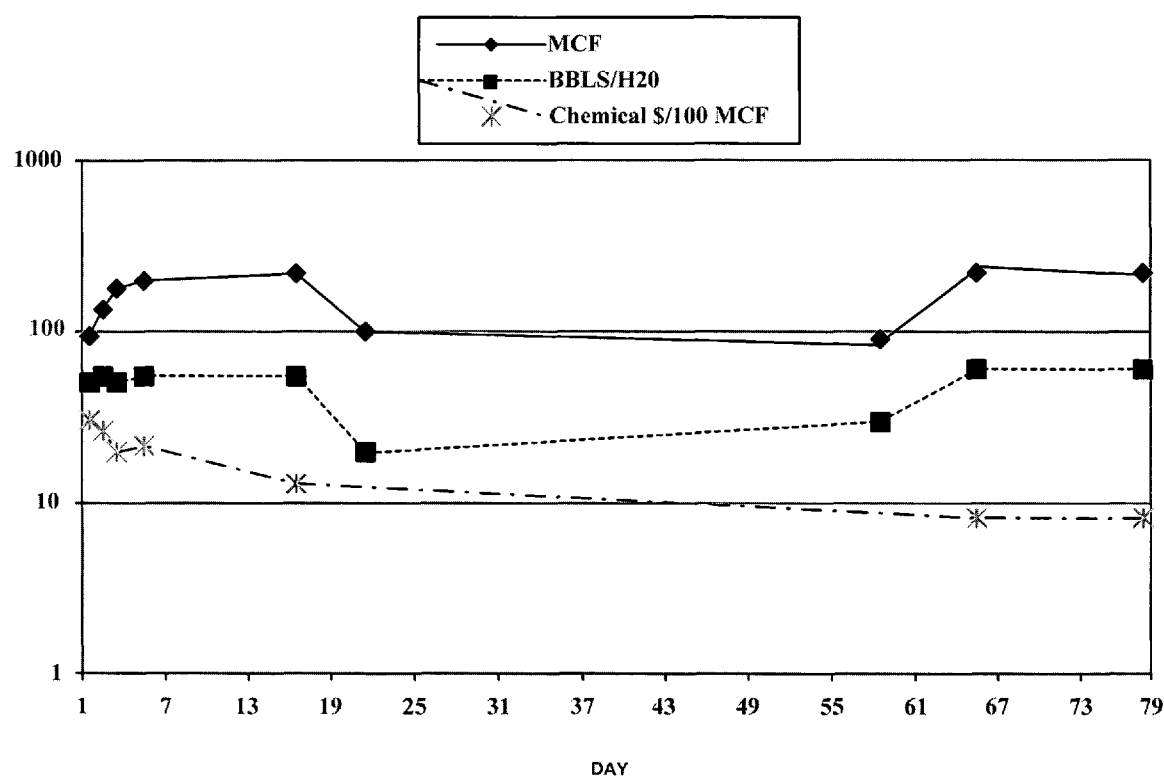
FIG. 9 depicts plot of production data for Corrosion Test 7.

Referring now to FIG. 9, the water production data associated with Corrosion Test 7 is shown clearly evidencing an increase in production and a decrease in cost after initial foam composition injection.

All references cited herein are incorporated by reference. While this invention has been described fully and completely, it should be understood that, within the scope of the appended claims, the invention may be practiced otherwise than as specifically described. Although the invention has been disclosed with reference to its preferred embodiments, from reading this description those of skill in the art may appreciate changes and modification that may be made which do not depart from the scope and spirit of the invention as described above and claimed hereafter.

We claim:

1. A method for supply a foaming composition to a downhole fluid comprising the steps of:
   inserting at least one capillary coiled tubing into a well borehole to a desired depth below a fluid level in the borehole and
   injecting an effective amount of a foaming composition to the fluid to produce a foam,
   where the foaming composition comprises from about 20 wt. % to about 80 wt. % at least one surfactant and from about 80 wt. % to about 20 wt. % at least one sulfur scavenging agent and optionally an additive, where the additive is selected from the group consisting of a carbon dioxide control agent, a corrosion inhibitor, a scale inhibitor, an oxygen control agent, a hydrocarbon dispersing agent and mixtures or combinations thereof,
   where the sulfur scavenging agent or the sulfur scavenging agent and the optional additive concentrate in bubble walls in bubbles in the foam,
   where the sulfur scavenger or the sulfur scavenger and the additive improve foam characteristics including foam stability and foam height, while simultaneously the resulting foam improves the activity of the sulfur scavenger or the activity of the sulfur scavenger and the additive, and where the effective amount is sufficient to decrease a fluid column weight increasing well fluids flow out of the well.

2. The method of claim 1, wherein the injecting comprises a single injection, multiple injections, periodic injections, continuation injections or mixtures or combinations thereof, depending on well requirements and desired flow rates.

3. A method comprising the steps of:
   injecting into a downhole fluid an aqueous solution comprising a first effective amount of a foaming composition to produce a foam;
   bringing the foam to a surface of the well;
   adding a defoaming agent to the foam at the surface to break the foam and produce a two phase system;
   separating production or organic fluids from the two phase system; and
   adding a supplemental effective amount of the foaming composition to reform a foam,
   where the foaming composition comprises from about 20 wt. % to about 80 wt. % at least one surfactant and from about 20 wt. % to about 80 wt. % at least one sulfur scavenging agent and optionally an additive, where the additive is selected from the group consisting of a carbon dioxide control agent, a corrosion inhibitor, a scale inhibitor, an oxygen control agent, a hydrocarbon dispersing agent and mixtures or combinations thereof,
   where the sulfur scavenging agent or the sulfur scavenging agent and the optional additive concentrate in bubble walls in bubbles in the foam, where the sulfur scavenger or the sulfur scavenger and the additive improve foam characteristics including foam stability and foam height, while simultaneously the resulting foam improves the activity of the sulfur scavenger or the activity of the sulfur scavenger and the additive, and where the effective amount is sufficient to decrease a fluid column weight increasing well fluids flow out of the well.

4. The method of claim 3, further comprising the steps of: repeating the bringing, adding, separating and adding steps a desired number of times.

5. A method comprising the steps of:
injecting into a downhole fluid via coiled tubing an aqueous solution comprising a first effective amount of a foaming composition below a fluid level to produce a foam downhole;
lifting the foam to a surface of the well;
separating the foam into an organic phase and an aqueous phase; and
optionally adding a defoaming agent to the foam to facilitate foam separation into the organic and aqueous phases;
where the foaming composition comprises from about 20 wt. % to about 80 wt. % at least one surfactant and from about 20 wt. % to about 80 wt. % at least one sulfur scavenging agent and optionally an additive, where the additive is selected from the group consisting of a carbon dioxide control agent, a corrosion inhibitor, a scale inhibitor, an oxygen control agent, a hydrocarbon dispersing agent and mixtures or combinations thereof,
where the sulfur scavenging agent or the sulfur scavenging agent and the optional additive concentrate in bubble walls in bubbles in the foam,
where the sulfur scavenger or the sulfur scavenger and the additive improve foam characteristics including foam stability and foam height, while simultaneously the resulting foam improves the activity of the sulfur scavenger or the activity of the sulfur scavenger and the additive, and where the effective amount is sufficient to decrease a fluid column weight increasing well fluids flow out of the well.

6. The method of claim 5, further comprising the steps of repeating the injecting, lifting, separating, and optional adding steps a desired number of times.

7. The method of claim 5, further comprising the steps of:
adding supplemental effective amounts of the foaming composition to reform a foam, and
reinjecting the aqueous phase into the downhole fluids via the coiled tubing.

8. The method of claim 7, further comprising the steps of: repeating the lifting, optional adding, separating, adding and reinjecting steps a desired number of times.

9. The method of claim 3, wherein the at least one surfactant is selected from the group consisting of anionic surfactants, cationic surfactants, non-ionic surfactants, zwitterionic compounds and mixtures thereof.

10. The method of claim 9, wherein the anion surfactants comprise sodium or ammonium alcohol ether sulfate surfactant or mixtures or combinations thereof, where the sodium or ammonium alcohol ether sulfate surfactants comprise compounds of the general formula $R^1O—(CH_2CH_2O)_nSO_3X$, where X is Na or $NH_4$, $R^1$ is a carbon-containing group including an alkyl group, an aryl group, an alkaryl group, an aralkyl group or mixture thereof.

11. The method of claim 10, wherein the sodium or ammonium alcohol ether sulfate surfactants are selected from the group consisting of short chain sodium or ammonium alcohol ether sulfate surfactants having between 2 and about 10 carbon atoms, long chain sodium or ammonium alcohol ether sulfate surfactants having between about 10 to about 24 carbon atoms, and mixtures or combinations thereof.

12. The method of claim 5, further comprising foaming additives selected from the group consisting of winterizing agents, foam boosters, anti-freeze agents, solvents, sodium salt of alpha olefin sulfonates (AOSs), acid salts, fatty acids, foam enhancers and mixtures or combinations thereof.

13. The method of claim 12, wherein the winterizing agents is selected from the group consisting of lithium formate, sodium formate, potassium formate, cesium formate, triethanolamine formate, and mixtures or combinations; the foam boosters comprise a cellosolve of the general formula $R^9OCH_2CH_2OH$ where $R^9$ is an alkyl group having between about 2 and about 8 carbon atoms and mixtures or combinations; the anti-freeze agents selected from the group consisting of alcohols, glycols or other freezing point depressing agents and mixtures or combinations; the solvents selected from the group consisting of water, alcohols, ethers, esters or mixtures or combinations thereof; the sodium salt of alpha olefin sulfonates (AOSs) selected from the group consisting of short chain alpha olefin sulfonates having between about 2 and about 10 carbon atoms, longer chain alpha olefin sulfonates having between about 10 and about 24 carbon atoms and mixtures or combinations thereof; the acid salts selected from the group consisting of cyclamic acid salts such as sodium (cyclamate), potassium, salts of sulfonated methyl esters having between about 12 and about 22 carbon atoms, where the salt is sodium, potassium, ammonium, alkylammonium, salts of 2-aminoethane sulfonic acids, where the salt is an alkali metal, ammonium, or alkylammonium, and mixtures or combinations thereof; the fatty acids are selected from the group consisting of lauric acid, oleic acid, stearic acid and mixtures or combinations; and the foam enhancers are selected from the group consisting of a linear dodecyl benzene sulfonic acid salt, a sarcosinate salt, and mixtures or combinations thereof.

14. The method of claim 1, further comprising at least one additive selected from the group consisting of corrosion inhibitors, scale inhibitors, oxygen control agents, hydrocarbon accumulation agents and mixtures or combinations thereof, where the foam improves an activity the at least one additive and the additive may improve foaming characteristics of the at least one surfactant.

15. The method of claim 1, wherein the at least one surfactant is selected from the group consisting of anionic surfactants, cationic surfactants, non-ionic surfactants, zwitterionic compounds and mixtures thereof.

16. The method of claim 15, wherein the anion surfactants comprise sodium or ammonium alcohol ether sulfate surfactant or mixtures or combinations thereof, where the sodium or ammonium alcohol ether sulfate surfactants comprise compounds of the general formula $R^1O—(CH_2CH_2O)_nSO_3X$, where X is Na or $NH_4$, $R^1$ is a carbon-containing group including an alkyl group, an aryl group, an alkaryl group, an aralkyl group or mixture thereof.

17. The method of claim 16, wherein the sodium or ammonium alcohol ether sulfate surfactants are selected from the group consisting of short chain sodium or ammonium alcohol ether sulfate surfactants having between 2 and about 10 carbon atoms, long chain sodium or ammonium alcohol ether sulfate surfactants having between about 10 to about 24 carbon atoms, and mixtures or combinations thereof.

18. The method of claim 1, further comprising foaming additives selected from the group consisting of winterizing agents, foam boosters, anti-freeze agents, solvents, sodium salt of alpha olefin sulfonates (AOSs), acid salts, fatty acids, foam enhancers and mixtures or combinations thereof.

19. The method of claim 18, wherein the winterizing agents is selected from the group consisting of lithium formate, sodium formate, potassium formate, cesium formate, triethanolamine formate, and mixtures or combinations; the foam boosters comprise a cellosolve of the general formula $R^9OCH_2CH_2OH$ where $R^9$ is an alkyl group having between about 2 and about 8 carbon atoms and mixtures or combinations; the anti-freeze agents selected from the group consisting of alcohols, glycols or other freezing point depressing agents and mixtures or combinations; the solvents selected from the group consisting of water, alcohols, ethers, esters or mixtures or combinations thereof; the sodium salt of alpha olefin sulfonates (AOSs) selected from the group consisting of short chain alpha olefin sulfonates having between about 2 and about 10 carbon atoms, longer chain alpha olefin sulfonates having between about 10 and about 24 carbon atoms and mixtures or combinations thereof; the acid salts selected from the group consisting of cyclamic acid salts such as sodium (cyclamate), potassium, salts of sulfonated methyl esters having between about 12 and about 22 carbon atoms, where the salt is sodium, potassium, ammonium, alkylammonium, salts of 2-aminoethane sulfonic acids, where the salt is an alkali metal, ammonium, or alkylammonium, and mixtures or combinations thereof; the fatty acids are selected from the group consisting of lauric acid, oleic acid, stearic acid and mixtures or combinations; and the foam enhancers are selected from the group consisting of a linear dodecyl benzene sulfonic acid salt, a sarcosinate salt, and mixtures or combinations thereof.

* * * * *